(12) United States Patent
Wang et al.

(10) Patent No.: US 12,119,651 B2
(45) Date of Patent: Oct. 15, 2024

(54) RESILIENCE ENHANCEMENT-ORIENTED ENERGY STORAGE CONTROL METHOD AND SYSTEM FOR DISTRIBUTED GENERATOR (DG) IN DISTRIBUTION NETWORK

(71) Applicants: STATE GRID SHANGHAI MUNICIPAL ELECTRIC POWER COMPANY, Shanghai (CN); East China Electric Power Test Research Institute Co., Ltd., Shanghai (CN); Shanghai Jiao Tong University, Shanghai (CN)

(72) Inventors: Saiyi Wang, Shanghai (CN); Xin Huang, Shanghai (CN); Weiguo He, Shanghai (CN); Chaoran Fu, Shanghai (CN); Haodong Shen, Shanghai (CN); Tangyun Xu, Shanghai (CN); Jie Chen, Shanghai (CN); Xu Wang, Shanghai (CN); Shichao Zhou, Shanghai (CN); Zhan Xiong, Shanghai (CN); Chuanwen Jiang, Shanghai (CN)

(73) Assignees: STATE GRID SHANGHAI MUNICIPAL ELECTRIC POWER COMPANY, Shanghai (CN); East China Electric Power Test Research Institute Co., Ltd., Shanghai (CN); Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 17/923,947

(22) PCT Filed: May 18, 2022

(86) PCT No.: PCT/CN2022/093452
§ 371 (c)(1),
(2) Date: Nov. 8, 2022

(87) PCT Pub. No.: WO2022/257712
PCT Pub. Date: Dec. 15, 2022

(65) Prior Publication Data
US 2024/0275167 A1    Aug. 15, 2024

(30) Foreign Application Priority Data

Jun. 11, 2021    (CN) .......................... 202110655637.4

(51) Int. Cl.
     *H02J 3/28*      (2006.01)
     *G06Q 50/06*      (2024.01)
     (Continued)

(52) U.S. Cl.
     CPC ................ *H02J 3/28* (2013.01); *G06Q 50/06* (2013.01); *H02J 3/0075* (2020.01); *H02J 3/381* (2013.01)

(58) Field of Classification Search
CPC ........... H02J 3/28; H02J 3/0075; H02J 3/381; G06Q 50/06
See application file for complete search history.

(56) References Cited

U.S. PATENT DOCUMENTS 11,515,833 B1\*   11/2022   Ginsberg-Klemmt ....................... H02S 20/30
2023/0370017 A1\*   11/2023   Ginsberg-Klemmt ....................... H02J 7/0042

FOREIGN PATENT DOCUMENTS

| CN | 110571807 A | | 12/2019 | |
|---|---|---|---|---|
| CN | 114386833 A | \* | 4/2022 | |
| CN | 112036690 B | \* | 12/2023 | .............. G06F 17/11 |

OTHER PUBLICATIONS

Shichao Zhou et al., Line Hardening and Energy Storage System Configuration Strategies for Resilience Enhancement of a Hybrid AC-DC Distribution System, Journal of Shanghai Jiao Tong University, Dec. 2021, pp. 1619-1630, vol. 55, No. 12.

Haibo Zhang et al., Distribution Network Energy Storage Planning Ensuring Uninterrupted Power Supply for Critical Loads, Power System Technology, Jan. 2021, pp. 259-268, vol. 45, No. 1.

(Continued)

*Primary Examiner* — Jared Fureman
*Assistant Examiner* — Michael J Warmflash

(57) ABSTRACT

A resilience enhancement-oriented energy storage control method and system for a distributed generator (DG) in a distribution network. The method includes: determining an objective function including a first sub-objective function and a second sub-objective function; determining an outer-level constraint based on a quantity of configured energy storage systems (ESSs), a quantity of hardened lines, and a (Continued)

rated power and capacity configuration of an ESS; determining a middle-level constraint based on a line failure; determining an inner-level constraint based on node power of a distribution network, a line load capacity, a line power flow, a power output of a unit, a node voltage, climbing of the unit, operation of the ESS, and LS; determining parameters based on the outer-level constraint, the first sub-objective function, the middle-level constraint, the inner-level constraint, and the second sub-objective function; and controlling energy storage of a DG in the distribution network.

10 Claims, 6 Drawing Sheets

(51) Int. Cl.
  *H02J 3/00* (2006.01)
  *H02J 3/38* (2006.01)

(56) References Cited

OTHER PUBLICATIONS

Shanshan Ma et al., Resilience Enhancement Strategy for Distribution Systems under Extreme Weather Events, IEEE Transactions on Smart Grid, Mar. 31, 2018, pp. 1442-1451, vol. 9, No. 2.

* cited by examiner

100

101 — Determine an objective function, where the objective function includes a first sub-objective function and a second sub-objective function, the first sub-objective function aims to minimize an investment cost at an outer level, and the second sub-objective function first aims to maximize an LS cost and a post-disaster operation cost at a middle level, and then minimize an LS cost and a post-disaster operation cost at an inner level 102 — Determine an outer-level constraint based on a quantity of configured ESSs, a quantity of hardened lines, and a rated power and capacity configuration of an ESS 103 — Determine a middle-level constraint based on a line failure 104 — Determine an inner-level constraint based on node power of a distribution network, a line load capacity, a line power flow, a power output of a unit, a node voltage, climbing of the unit, operation of the ESS, and LS 105 — Determine parameters based on the outer-level constraint, the first sub-objective function, the middle-level constraint, the inner-level constraint, and the second sub-objective function 106 — Control energy storage of a DG in the distribution network based on the obtained parameters

- Objective function determining unit 601
- Outer-level constraint determining unit 602
- Middle-level constraint determining unit 603
- Inner-level constraint determining unit 604
- Parameter determining unit 605
- Energy storage control unit 606

FIG. 6

RESILIENCE ENHANCEMENT-ORIENTED ENERGY STORAGE CONTROL METHOD AND SYSTEM FOR DISTRIBUTED GENERATOR (DG) IN DISTRIBUTION NETWORK

TECHNICAL FIELD

The present disclosure relates to the technical field of responding to extreme events of an alternating current (AC)/direct current (DC) distribution network, and more specifically, to a resilience enhancement-oriented energy storage control method and system for a distributed generator (DG) in a distribution network.

BACKGROUND

As an important infrastructure in modern society, a power system supports economic, commercial and social development and plays a vital role in normal operation of society and economy. Any large-scale power outage and paralysis in the power system cause a huge impact to society. With the rapid progress of society and the rapid development of a power grid, a higher requirement is imposed on reliability of electric power supply of the power system. Traditional reliability indexes mainly focus on a possible high-probability failure of the power grid. However, many global accidents in recent years show that it is far from enough to focus only on predictable and small-scale accidents under normal operating conditions. An extreme event often damages the power grid. Many components fail due to a disaster, and a large-scale power outage occurs in the power grid, which seriously affects post-disaster recovery and reconstruction of a facility affected by the disaster.

Two measures are usually taken to enhance resilience of a distribution network: a preventive measure before the disaster, and a recovery measure during and after the disaster. The preventive measure is to determine severity of an impact of a large disturbance in the system on the distribution network in advance based on relevant forecast information, quickly switch an operation mode of the distribution network, make the distribution network in an optimal operation state, narrow an outage range, and support power consumption of key loads. The recovery measure is a regulation mode in which the distribution network takes an active measure to prevent outages of the key loads and quickly recovers to an expected state of the system under normal conditions during or after the large disturbance in the system.

SUMMARY

The present disclosure provides a resilience enhancement-oriented energy storage control method and system for a DG in a distribution network, so as to control energy storage of a DG in a distribution network.

To resolve the above problem, an aspect of the present disclosure provides a resilience enhancement-oriented energy storage control method for a DG in a distribution network. The method includes:
determining an objective function, where the objective function includes a first sub-objective function and a second sub-objective function, the first sub-objective function aims to minimize an investment cost at an outer level, and the second sub-objective function first aims to maximize a load shedding (LS) cost and a post-disaster operation cost at a middle level, and then minimize an LS cost and a post-disaster operation cost at an inner level;
determining an outer-level constraint based on a quantity of configured energy storage systems (ESSs), a quantity of hardened lines, and a rated power and capacity configuration of an ESS;
determining a middle-level constraint based on a line failure;
determining an inner-level constraint based on node power of a distribution network, a line load capacity, a line power flow, a power output of a unit, a node voltage, climbing of the unit, operation of the ESS, and LS;
determining, based on the outer-level constraint and the first sub-objective function, a unit hardening investment cost $c_{ij}^I$ of a line, a line length $s_{ij}$, a binary decision variable $y_{ij}$ for line hardening, a first cost coefficient $c^e$, a second cost coefficient $c^p$, and a capacity $E_i^R$ and rated power $P_i^R$ of an ESS configured on node i; and determining a power output $c_g^G$ of a DG, a unit cost coefficient $c_i^{ch}$ of charging of the ESS, a unit cost coefficient $c_i^{dis}$ of discharging of the ESS, a unit LS cost $c_i^{LS}$ after a load weight is considered, an LS ratio $\rho_{i,t}$ of node i, and load $p_{i,t}^D$ of node i based on the middle-level constraint, the inner-level constraint, the second sub-objective function; and
controlling energy storage of the DG in the distribution network based on the obtained parameters.

Preferably, the outer-level constraint includes: a sub-constraint on the quantity of configured ESSs, a sub-constraint on the quantity of hardened lines, and a sub-constraint on the rated power and capacity configuration of the ESS;
the sub-constraint on the quantity of configured ESSs includes:

$$\sum_{i \in \Omega_B} \sigma_i \leq N_{ES}^{INV}$$

the sub-constraint on the quantity of hardened lines includes:

$$\sum_{(i,j) \in \Omega_L} y_{ij} \leq N_L^{INV};$$

and
the sub-constraint on the rated power and capacity configuration of the ESS includes:

$$0 \leq P_i^R \leq \sigma_i P_i^{R,max}, \forall i \in \Omega_B$$

$$0 \leq E_i^R \leq \sigma_i E_i^{R,max}, \forall i \in \Omega_B$$

where $\sigma_i$ represents a binary decision variable for ESS configuration, where when a value of the variable is 1, node i is configured with the ESS, otherwise, the node is not configured with the ESS; $N_{ES}^{INV}$ represents a maximum allowable quantity of configured ESSs; $N_L^{INV}$ represents a maximum quantity of hardened lines; $P_i^{R,max}$ and $E_i^{R,max}$ respectively represent upper limits of configurable rated power and a configurable capacity of the ESS; when $\sigma_i=0$, node i is not configured with the ESS, which is equivalent to setting both the rated power and the capacity of the ESS to 0; $E_i^R$ and $P_i^R$ respectively represent the capacity and the rated power of the ESS configured on node i; $\Omega_g$ represents a node set of an AC/DC distribution network; $\Omega_L$ represents a line set of the AC/DC distribution network; and $y_{ij}$ represents the binary decision variable for line hardening.

Preferably, the middle-level constraint includes:

$$\sum_{(i,j)\in\Omega_L} (-\log_2 p_{ij}^{dam}) z_{ij,0} \leq W_{max}$$

where $p_{ij}^{dam}$ presents a line failure rate; $z_{ij,0}$ represents a binary variable, indicating whether a failure occurs on the line, and a value of the binary variable is 1 when a failure occurs and 0 when no failure occurs; $W_{max}$ represents an upper limit of an uncertain entropy value of the line failure in the distribution network; and $\Omega_L$ represents a line set of an AC/DC distribution network.

Preferably, the inner-level constraint includes: a sub-constraint on the node power of the distribution network, a sub-constraint on the line load capacity, a sub-constraint on the line power flow, a power output sub-constraint of the unit, a node voltage sub-constraint, a climbing sub-constraint of the unit, a state sub-constraint of the ESS, and an LS sub-constraint;

the state sub-constraint of the ESS includes:

$$S_i(t) = S_i(t-1) + p_i^{ch}(t)\eta_{ch}\Delta t - \frac{p_i^{dis}(t)\Delta t}{\eta_{dis}}, \forall i \in \Omega_B, \forall t \in T$$

$$SOC_{i,min} \leq \frac{S_i(t)}{E_i^R} \leq SOC_{i,max}, \forall i \in \Omega_B, \forall t \in T$$

$$0 \leq p_i^{ch}(t) \leq P_i^R, \forall i \in \Omega_B, \forall t \in T$$

$$0 \leq p_i^{dis}(t) \leq P_i^R, \forall i \in \Omega_B, \forall t \in T$$

$$p_i^{ch}(t) \cdot p_i^{dis}(t) = 0, \forall i \in \Omega_B, \forall t \in T;$$

and the LS sub-constraint includes:

$$0 \leq \rho_{i,t} \leq 1, \forall i \in \Omega_B, \forall t \in T$$

where $S_i(t)$ represents a remaining electricity quantity at time t; $n_{ch}, n_{dis}$ represent charging efficiency and discharging efficiency respectively; $\Delta t$ represents a time interval; $p_i^{ch}(t)$ represents charging power; $p_i^{dis}(t)$ represents discharging power; and PR represents an upper charging/discharging limit.

Preferably, the first sub-objective function includes:

$$\min_{y \in Y} C^{INV}$$

$$C^{INV} = C_L^{INV} + C_{ES}^{INVV}$$

$$C_L^{INV} = \beta_l \sum_{(i,j)\in\Omega_L} c_{ij}^l s_{ij} y_{ij}$$

$$C_{ES}^{INV} = \beta_{es}\left(\sum_{i\in\Omega_B} c^e E_i^R + c^p P_i^R\right);$$

and the second sub-objective function includes:

$$\rho_{pre}\max_{u\in U}\min_{x\in F(y,u)} \left(C^{OPE} + C^{LS}\right)$$

$$C^{OPE} = \sum_{t\in T}\left[\sum_{g\in\Omega_G} c_g^G p_{g,t}^G + \sum_{i\in\Omega_B} \left(c_i^{dis} p_{i,t}^{dis} + c_i^{ch} p_{i,t}^{ch}\right)\right]$$

$$C^{LS} = \sum_{i\in\Omega_B, t\in T} c_i^{LS} \rho_{i,t} p_{i,t}^D$$

where Y,U,F represent variable sets of tri-level decision-making respectively; $C^{INV}$ represents an investment cost; $C^{OPE}$ and $C^{LS}$ represent the post-disaster operation cost and the LS cost respectively; $\rho_{pre}$ represents introduction of a resilience preference coefficient; $C_L^{INV}$ represents an investment cost for line hardening; $C_{ES}^{INV}$ represents an investment cost for energy storage resource configuration; $c_{ij}^l$ represents the unit hardening investment cost of the line; $s_{ij}$ represents the line length; $y_{ij}$ represents the binary decision variable for line hardening; $\beta_l$ represents a coefficient for converting a total investment cost of the line into a one-year cost based on a planned period; $\Omega_L$ represents a line set of an AC/DC distribution network; $c^e$ and $c^p$ represent cost coefficients; $\beta_{es}$ represents a coefficient for converting a total investment cost of the ESS into a one-year cost based on a planned period; $\Omega_B$ represents a node set of the AC/DC distribution network; $E_i^R$ and $P_i^R$ respectively represent the capacity and the rated power of the ESS configured on node i; $c_i^{LS}$ represents the unit LS cost after the load weight is considered; $\rho_{i,t}$ represents the LS ratio of node i at time t; $p_{i,t}^D$ represents the load of the node at the corresponding time; T represents duration of an extreme event; and $c_g^G$, $c_i^{ch}$, and $c_i^{dis}$ represent the power output of the DG, the unit cost coefficient for charging of the ESS, and the unit cost coefficient for discharging of the ESS respectively.

Another aspect of the present disclosure provides a resilience enhancement-oriented energy storage control system for a DG in a distribution network. The system includes:

an objective function determining unit configured to determine an objective function, where the objective function includes a first sub-objective function and a second sub-objective function, the first sub-objective function aims to minimize an investment cost at an outer level, and the second sub-objective function first aims to maximize an LS cost and a post-disaster operation cost at a middle level, and then minimize an LS cost and a post-disaster operation cost at an inner level;

an outer-level constraint determining unit configured to determine an outer-level constraint based on a quantity of configured ESSs, a quantity of hardened lines, and a rated power and capacity configuration of the ESS;

a middle-level constraint determining unit configured to determine a middle-level constraint based on a line failure;

an inner-level constraint determining unit configured to determine an inner-level constraint based on node power of a distribution network, a line load capacity, a line power flow, a power output of a unit, a node voltage, climbing of the unit, operation of the ESS, and LS;

a parameter determining unit configured to determine, based on the outer-level constraint and the first sub-objective function, a unit hardening investment cost $c_{ij}^l$ of a line, a line length $s_{ij}$, a binary decision variable $y_{ij}$ for line hardening, a first cost coefficient $c^e$, a second cost coefficient $c^p$, and a capacity $E_i^R$ and rated power $P_i^R$ of an ESS configured on node i; and determine a power output $c_g^G$ of a DG, a unit cost coefficient $c_i^{ch}$ of charging of the ESS, a unit cost coefficient $c_i^{dis}$ of discharging of the ESS, a unit LS cost $c_i^{LS}$ after a load weight is considered, an LS ratio $\rho_{i,t}$ of node i, and load $p_{i,t}^D$ of node i based on the middle-level constraint, the inner-level constraint, and the second sub-objective function; and an energy storage control unit configured to control energy storage of the DG in the distribution network based on the obtained parameters.

Preferably, the outer-level constraint includes: a sub-constraint on the quantity of configured ESSs, a sub-constraint on the quantity of hardened lines, and a sub-constraint on the rated power and capacity configuration of the ESS;

the sub-constraint on the quantity of configured ESSs includes:

$$\sum_{i \in \Omega_B} \sigma_i \leq N_{ES}^{INV}$$

the sub-constraint on the quantity of hardened lines includes:

$$\sum_{(i,j) \in \Omega_L} y_{ij} \leq N_L^{INV};$$

and
the sub-constraint on the rated power and capacity configuration of the ESS includes:

$$0 \leq P_i^R \leq \sigma_i P_i^{R,max}, \forall i \in \Omega_B$$

$$0 \leq E_i^R \leq \sigma_i E_i^{R,max}, \forall i \in \Omega_B$$

where $\sigma_i$ represents a binary decision variable for ESS configuration, where when a value of the variable is 1, node i is configured with the ESS, otherwise, the node is not configured with the ESS; $N_{ES}^{INV}$ represents a maximum allowable quantity of configured ESSs; $N_L^{INV}$ represents a maximum quantity of hardened lines; $P_i^{R,max}$ and $E_i^{R,max}$ respectively represent upper limits of configurable rated power and a configurable capacity of the ESS; when $\sigma_i=0$, node i is not configured with the ESS, which is equivalent to setting both the rated power and the capacity of the ESS to 0; $E_i^R$ and $P_i^R$ respectively represent the capacity and the rated power of the ESS configured on node i; $\Omega_B$ represents the node set of the AC/DC distribution network; $\Omega_L$ represents the line set of the AC/DC distribution network; and $y_{ij}$ represents the binary decision variable for line hardening.

Preferably, the middle-level constraint includes:

$$\sum_{(i,j) \in \Omega_L} (-\log_2 p_{ij}^{dam}) z_{ij,0} \leq W_{max}$$

where pam represents a line failure rate; $z_{ij,0}$ represents a binary variable, indicating whether a failure occurs on the line, and a value of the binary variable is 1 when a failure occurs and 0 when no failure occurs; $W_{max}$ represents an upper limit of an uncertain entropy value of the line failure in the distribution network; and $\Omega_L$ represents a line set of an AC/DC distribution network.

Preferably, the inner-level constraint includes: a sub-constraint on the node power of the distribution network, a sub-constraint on the line load capacity, a sub-constraint on the line power flow, a power output sub-constraint of the unit, a node voltage sub-constraint, a climbing sub-constraint of the unit, a state sub-constraint of the ESS, and an LS sub-constraint;

the state sub-constraint of the ESS includes:

$$S_i(t) = S_i(t-1) + p_i^{ch}(t)\eta_{ch}\Delta t - \frac{p_i^{dis}(t)\Delta t}{\eta_{dis}}, \forall i \in \Omega_B, \forall t \in T$$

$$SOC_{i,min} \leq \frac{S_i(t)}{E_i^R} \leq SOC_{i,max}, \forall i \in \Omega_B, \forall t \in T$$

$$0 \leq p_i^{ch}(t) \leq P_i^R, \forall i \in \Omega_B, \forall t \in T$$

$$0 \leq p_i^{dis}(t) \leq P_i^R, \forall i \in \Omega_B, \forall t \in T$$

$$p_i^{ch}(t) \cdot p_i^{dis}(t) = 0, \forall i \in \Omega_B, \forall t \in T;$$

and
the LS sub-constraint includes:

$$0 \leq \rho_{i,t} \leq 1, \forall i \in \Omega_B, \forall t \in T$$

where $S_i(t)$ represents a remaining electricity quantity at time t; $\eta_{ch}, \eta_{dis}$ represent charging efficiency and discharging efficiency respectively; $\Delta t$ represents a time interval; $p_i^{ch}(t)$ represents charging power; $p_i^{dis}(t)$ represents discharging power; and $P_i^R$ represents an upper charging/discharging limit.

Preferably, the first sub-objective function includes:

$$\min_{y \in Y} C^{INV}$$

$$C^{INV} = C_L^{INV} + C_{ES}^{INVV}$$

$$C_L^{INV} = \beta_l \sum_{(i,j) \in \Omega_L} c_{ij}^l s_{ij} y_{ij}$$

$$C_{ES}^{INV} = \beta_{es} \left( \sum_{i \in \Omega_B} c^e E_i^R + c^p P_i^R \right);$$

and
the second sub-objective function includes:

$$\rho_{pre} \tau \max_{u \in U} \min_{x \in F(y,u)} (C^{OPE} + C^{LS})$$

$$C^{OPE} = \sum_{t \in T} \left[ \sum_{g \in \Omega_G} c_g^G p_{g,t}^G + \sum_{i \in \Omega_B} \left( c_i^{dis} p_{i,t}^{dis} + c_i^{ch} p_{i,t}^{ch} \right) \right]$$

$$C^{LS} = \sum_{i \in \Omega_B, t \in T} c_i^{LS} \rho_{i,t} p_{i,t}^D$$

where Y,U,F represent variable sets of tri-level decision-making respectively; $C^{INV}$ represents an investment cost; $C^{OPE}$ and $C^{LS}$ represent the post-disaster operation cost and the LS cost respectively; $\rho_{pre}$ represents introduction of a resilience preference coefficient;

$C_L^{INV}$ represents an investment cost for line hardening; $C_{ES}^{INV}$ represents an investment cost for energy storage resource configuration; $c_{ij}^l$ represents the unit hardening investment cost of the line; $s_{ij}$ represents the line length; $y_{ij}$ represents the binary decision variable for line hardening; $\beta_l$ represents a coefficient for converting a total investment cost of the line into a one-year cost based on a planned period; $\Omega_L$ represents a line set of an AC/DC distribution network; $c^e$ and $c^p$ represent cost coefficients; $\beta_{es}$ represents a coefficient for converting a total investment cost of the ESS into a one-year cost based on a planned period; $\Omega_B$ represents a node set of the AC/DC distribution network; $E_i^R$ and PR respectively represent the capacity and the rated power of the ESS configured on node i; $c_i^{LS}$ represents the unit LS cost after the load weight is considered; $\rho_{i,t}$ represents the LS ratio of node i at time t; $p_{i,t}^D$ represents the load of the node at the corresponding time; T represents duration of an extreme event; and $c_g^G$, $c_i^{ch}$, and $c_i^{dis}$ represent the power output of the DG, the unit cost coefficient for charging of the ESS, and the unit cost coefficient for discharging of the ESS respectively.

The present disclosure provides a resilience enhancement-oriented energy storage control method and system for a DG in a distribution network, to study a line hardening strategy and an ESS configuration strategy in a planning period based on a pre-disaster defense stage, construct tri-level constraints and corresponding objective functions, and control energy storage of a DG in a distributed network based on solved parameters. Based on an impact of a predicted failure caused by an extreme event to the distribution network on safe operation of the system, the present disclosure establishes an energy storage planning model that is of the DG in the distribution network and considers resilience enhancement. The method in the present disclosure can weigh a relationship between a resilience enhancement cost of the distribution network and an improvement of an ability to resist the extreme event.

BRIEF DESCRIPTION OF THE DRAWINGS

Exemplary implementations of the present disclosure can be more completely understood with reference to the following accompanying drawings.

FIG. 1 is a flowchart of a resilience enhancement-oriented energy storage control method 100 for a DG in a distribution network according to an implementation of the present disclosure;

FIG. 6 is a schematic structural diagram of a resilience enhancement-oriented energy storage control system 600 for a DG in a distribution network according to an implementation of the present disclosure.

DETAILED DESCRIPTION

Figure 2:
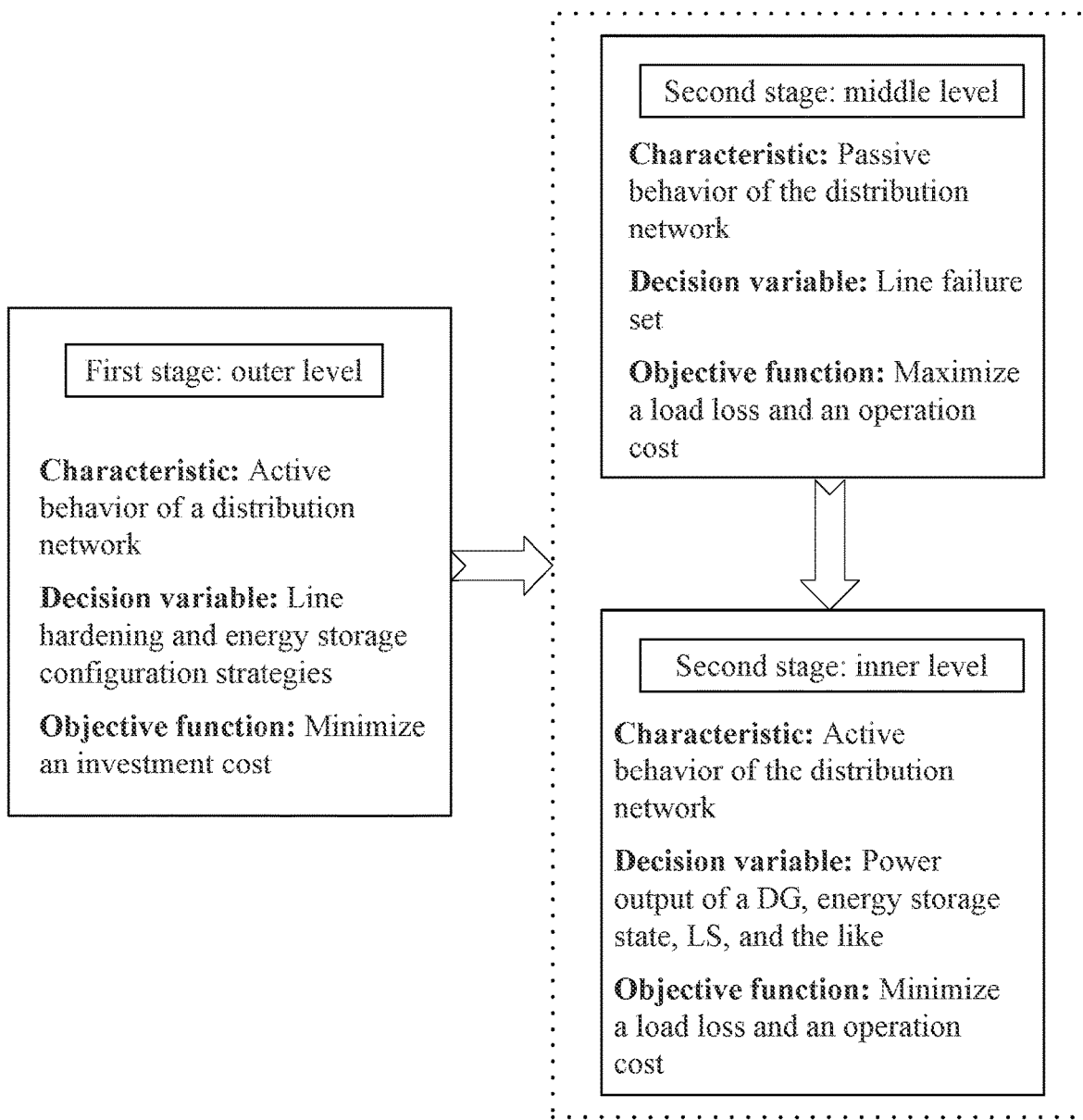
FIG. 2 is a schematic diagram of an optimization model according to an implementation of the present disclosure.

Exemplary implementations of the present disclosure are described below with reference to the accompanying drawings. However, the present disclosure can be implemented in many different forms and is not limited to the embodiments described herein. The embodiments are provided to thoroughly and completely understand the present disclosure, and fully convey the scope of the present disclosure to a person skilled in the art. The terms in the exemplary implementations in the accompanying drawings are not a limitation of the present disclosure. In the accompanying drawings, the same units/elements are designated by same reference numerals.

Unless otherwise specified, the terms (including technical and scientific terms) used herein have the same meanings as those commonly understood by those skilled in the art. In addition, it can be understood that the terms defined in commonly used dictionaries will be interpreted as having the same meanings as the contextual meanings in the related technical field, and will not be interpreted as having idealized or overly formal meanings.

FIG. 1 is a flowchart of a resilience enhancement-oriented energy storage control method 100 for a DG in a distribution network according to an implementation of the present disclosure. As shown in FIG. 1, this implementation of the present disclosure provides a resilience enhancement-oriented energy storage control method for a DG in a distribution network, to study an impact of a predicted failure caused by an extreme event to a distribution network on safe operation of a system, and establish an energy storage planning model that is of a DG in the distribution network and considers resilience enhancement, so as to weigh a relationship between a resilience enhancement cost of the distribution network and an improvement of an ability to resist the extreme event. The resilience enhancement-oriented energy storage control method 100 for a DG in a distribution network provided in this implementation of the present disclosure starts from step 101. In the step 101, an objective function is determined, where the objective function includes a first sub-objective function and a second sub-objective function, the first sub-objective function aims to minimize an investment cost at an outer level, and the second sub-objective function first aims to maximize an LS cost and a post-disaster operation cost at a middle level, and then minimize an LS cost and a post-disaster operation cost at an inner level.

Preferably, the first sub-objective function includes:

$$\min_{y \in Y} C^{INV}$$

$$C^{INV} = C_L^{INV} + C_{ES}^{INVV}$$

$$C_L^{INV} = \beta_l \sum_{(i,j) \in \Omega_L} c_{ij}^l s_{ij} y_{ij}$$

$$C_{ES}^{INV} = \beta_{es} \left( \sum_{i \in \Omega_B} c^e E_i^R + c^p P_i^R \right);$$

and the second sub-objective function includes:

$$\rho_{pre}\tau\max_{u\in U}\min_{x\in F(y,u)}\left(C^{OPE}+C^{LS}\right)$$

$$C^{OPE}=\sum_{t\in T}\left[\sum_{g\in\Omega_G}c_g^G p_{g,t}^G+\sum_{i\in\Omega_B}\left(c_i^{dis}p_{i,t}^{dis}+c_i^{ch}p_{i,t}^{ch}\right)\right]$$

$$C^{LS}=\sum_{i\in\Omega_B,t\in T}c_i^{LS}\rho_{i,t}p_{i,t}^D$$

where Y,U,F represent variable sets of tri-level decision-making respectively; $C^{INV}$ represents an investment cost; $C^{OPE}$ and $C^{LS}$ represent the post-disaster operation cost and the LS cost respectively; $\rho_{pre}$ represents introduction of a resilience preference coefficient; $C_L^{INV}$ represents an investment cost for line hardening; $C_{ES}^{INV}$ represents an investment cost for energy storage resource configuration; $c_{ij}^l$ represents a unit hardening investment cost of a line; $s_{ij}$ represents a line length; $y_{ij}$ represents a binary decision variable for line hardening; $\beta_l$ represents a coefficient for converting a total investment cost of the line into a one-year cost based on a planned period; $\Omega_L$ represents a line set of an AC/DC distribution network; $c^e$ and $c^p$ represent cost coefficients; $\beta_{es}$ represents a coefficient for converting a total investment cost of an ESS into a one-year cost based on a planned period; $\Omega_B$ represents a node set of the AC/DC distribution network; $E_i^R$ and $P_i^R$ respectively represent a capacity and rated power of an ESS configured on node i; $c_i^{LS}$ represents a unit LS cost after a load weight is considered; $\rho_{i,t}$ represents an LS ratio of node i at time t; $p_{i,t}^D$ represents load of the node at the corresponding time; T represents duration of an extreme event; and $c_g^G$, $c_i^{ch}$, and $c_i^{dis}$ represent a power output of a DG, a unit cost coefficient for charging of the ESS, and a unit cost coefficient for discharging of the ESS respectively.

An operation state is the best test and verification of planning and configuration schemes. Therefore, this patent gives consideration to a response state of the distribution network for the extreme event when determining a pre-disaster resilience enhancement strategy, and constructs a two-stage optimization model. In a second stage, an uncertain failure set is generated. Stochastic optimization and robust optimization are most widely used to process failure uncertainty. For the following two reasons, this patent adopts robust optimization to study the operation state of the distribution network under a most serious failure set:

1) In a planning stage, various complex situations of actual operation shall be fully considered, and accordingly, planning behaviors shall ensure the stable supply of an important load in the face of all extreme events.

2) It is difficult to apply stochastic optimization to two-stage problems. A random variable in the second stage will be affected by a decision in a first stage, and its probability distribution is also uncertain. Moreover, this uncertainty is fused in an optimization problem, making it difficult to establish a model independently. Therefore, feasibility of stochastic optimization in practical operations is low.

Therefore, the present disclosure proposes a two-stage robust optimization model, as shown in FIG. 2. Therefore, a total objective function of the two-stage robust optimization model can be expressed as:

$$\min_{y\in Y}C^{INV}+\rho_{pre}\tau\max_{u\in U}\min_{x\in F(y,u)}\left(C^{OPE}+C^{LS}\right) \quad (1)$$

The formula (1) is essentially a tri-level defender-attacker-defender model. In the tri-level defender-attacker-defender model, the outermost level reflects an active behavior of the distribution network and determines line hardening and ESS configuration strategies; the middle level reflects a passive behavior and determines the most serious failure set after the extreme event; and the inner level reflects the active behavior of the distribution network, and determines failure response and dispatching operation strategies of the distribution network. Y,U,F represent the variable sets of tri-level decision-making respectively. $C^{INV}$ represents the investment cost, and $C^{OPE}$ and $C^{LS}$ represent the post-disaster operation cost and the LS cost respectively. Considering that an investment is not only used to enhance resilience, the resilience preference coefficient $\rho_{pre}$ is introduced to reflect a resilience tendency in a planning period. $\tau$ represents a quantity of extreme events in the planning period.

The investment cost includes a line hardening cost and an ESS configuration cost, and its expression is shown in the following formula (2). The line hardening strategy includes overhead line cabling, tower upgrading, line expansion, line material selection upgrading, and the like. The present disclosure selects a most direct hardening mode, namely, line material selection upgrading, to conveniently analyze a change of a line failure rate before and after hardening. A most widely used lithium battery ESS is selected as the ESS.

$$C^{INV}=C_L^{INV}+C_{ES}^{INV} \quad (2)$$

In the above formula, $C_L^{INV}$ represents the investment cost for line hardening, and $C_{ES}^{INV}$ represents the investment cost for energy storage resource configuration. An investment period of line hardening is usually provided by a manufacturer. A service life of the ESS is related to its charging and discharging depths, and an operation state of the ESS needs to be constrained based on a specified service life expectation. As the planned periods of the line and the ESS are different, investment costs of the line and the ESS need to be converted into one-year costs. Accordingly, T in the formula (1) also represents an annual average quantity of extreme events.

$$C_L^{INV}=\beta_l\sum_{(i,j)\in\Omega_L}c_{ij}^l s_{ij}y_{ij} \quad (3)$$

$$C_{ES}^{INV}=\beta_{es}\left(\sum_{i\in\Omega_B}c^e E_i^R+c^p P_i^R\right) \quad (4)$$

In the above formulas, $c_{ij}^l$ represents the unit hardening investment cost of the line; $s_{ij}$ represents the line length; and $y_{ij}$ represents the binary decision variable for line hardening, and line hardening is performed when the variable is set to 1, and no hardening is performed when the variable is set to 0. $\beta_l$ represents the coefficient for converting the total investment cost of the line into the one-year cost based on the planned period. $\Omega_L$ represents the line set of the AC/DC distribution network. It should be noted that a tie line of a voltage source converter (VSC) is not considered for line hardening. The ESS configuration cost can be obtained according to the formula (4), and is linear with a total capacity and rated power of the ESS. $c^e$ and $c^p$ represent the cost coefficients, and $\beta_{es}$ represent the coefficient for converting the total investment cost of the ESS into the one-year cost based on the planned period. $\Omega_B$ represents the node set of the AC/DC distribution network, and $E_i^R$ and $P_i^R$ represents the capacity and the rated power of the ESS configured on node i.

The post-disaster operation cost $C^{OPE}$ includes a power output cost of the DG and an operation cost of the ESS, and can be expressed as follows:

$$C^{OPE} = \sum_{t \in T}\left[\sum_{i \in \Omega_G} c_i^G p_{i,t}^G + \sum_{i \in \Omega_B}\left(c_i^{dis} p_{i,t}^{dis} + c_i^{ch} p_{i,t}^{ch}\right)\right] \quad (5)$$

In the above formula, T represents the duration of the extreme event, and $c_g^G$, $c_i^{ch}$, and $c_i^{dis}$ represent the power output of the DG, the unit cost coefficient for charging of the ESS, and the unit cost coefficient for discharging of the ESS respectively.

The LS cost $C^{LS}$ is expressed as the following formula (6):

$$C^{LS} = \sum_{i \in \Omega_B, t \in T} c_i^{LS} \rho_{i,t} p_{i,t}^D \quad (6)$$

In the above formula, $c_i^{LS}$ represents the unit LS cost after the load weight is considered; $\rho_{i,t}$ represents the LS ratio of node i at time t; and $p_{i,t}^D$ represents the load of the node at the corresponding time.

In step 102, an outer-level constraint is determined based on a quantity of configured ESSs, a quantity of hardened lines, and a rated power and capacity configuration of the ESS.

Preferably, the outer-level constraint includes: a sub-constraint on the quantity of configured ESSs, a sub-constraint on the quantity of hardened lines, and a sub-constraint on the rated power and capacity configuration of the ESS;

the sub-constraint on the quantity of configured ESSs includes:

$$\sum_{i \in \Omega_B} \sigma_i \leq N_{ES}^{INV}$$

the sub-constraint on the quantity of hardened lines includes:

$$\sum_{(i,j) \in \Omega_L} y_{ij} \leq N_L^{INV};$$

and
the sub-constraint on the rated power and capacity configuration of the ESS includes:

$$0 \leq P_i^R \leq \sigma_i P_i^{R,max}, \forall i \in \Omega_B$$

$$0 \leq E_i^R \leq \sigma_i E_i^{R,max}, \forall i \in \Omega_B$$

where $\sigma_i$ represents a binary decision variable for ESS configuration, where when a value of the variable is 1, node i is configured with the ESS, otherwise, the node is not configured with the ESS; $N_{ES}^{INV}$ represents a maximum allowable quantity of configured ESSs; $N_L^{INV}$ represents a maximum quantity of hardened lines; $P_i^{R,max}$ and $E_i^{R,max}$ respectively represent upper limits of configurable rated power and a configurable capacity of the ESS; when $\sigma_i=0$, node i is not configured with the ESS, which is equivalent to setting both the rated power and the capacity of the ESS to 0; $E_i^R$ and $P_i^R$ respectively represent the capacity and the rated power of the ESS configured on node i; $\Omega_B$ represents the node set of the AC/DC distribution network; $\Omega_L$ represents the line set of the AC/DC distribution network; and $y_{ij}$ represents the binary decision variable for line hardening.

In the present disclosure, an outer-level decision variable is $Y=\{y_{ij}, \sigma_i, E_i^R, P_i^R\}$. Considering that the investment cost is an optimization item of the objective function, the investment cost is not directly limited in the constraints, but the quantity of hardened lines and the quantity of configured ESSs are limited to enhance investment feasibility.

(1) Constraint on the Quantity of Configured ESSs $$\sum_{i \in \Omega_B} \sigma_i \leq N_{ES}^{INV} \quad (7)$$

In the above formula, $\sigma_i$ represents the binary decision variable for ESS configuration. When a value of the variable is 1, node i is configured with the ESS, otherwise, the node is not configured with the ESS. $N_{ES}^{INV}$ represents the maximum allowable quantity of configured ESSs.

(2) Constraint on the Quantity of Hardened Lines $$\sum_{(i,j) \in \Omega_L} y_{ij} \leq N_L^{INV} \quad (8)$$

In the above formula, $N_L^{INV}$ represents the maximum quantity of hardened lines.

(3) Constraint on the Rated Power and Capacity Configuration of the ESS $$0 \leq P_i^R \leq \sigma_i P_i^{R,max}, \forall i \in \Omega_B$$

$$0 \leq E_i^R \leq \sigma_i E_i^{R,max}, \forall i \in \Omega_B \quad (9)$$

In the above formula, $P_i^{R,max}$ and $E_i^{R,max}$ respectively represent the upper limits of the configurable rated power and the configurable capacity of the ESS. When $\sigma_i=0$, node i is not configured with the ESS, which is equivalent to setting both the rated power and the capacity of the ESS to 0.

In step 103, a middle-level constraint is determined based on a line failure.

Preferably, the middle-level constraint includes:

$$\sum_{(i,j) \in \Omega_L} \left(-\log_2 p_{ij}^{dam}\right) z_{ij,0} \leq W_{max}$$

where $p_{ij}^{dam}$ represents the line failure rate; $z_{ij,0}$ represents a binary variable, indicating whether a failure occurs on the line, and a value of the binary variable is 1 when a failure occurs and 0 when no failure occurs; $W_{max}$ represents an upper limit of an uncertain entropy value of the line failure in the distribution network; and $\Omega_L$ represents the line set of the AC/DC distribution network.

In the present disclosure, the most serious failure set is determined at the middle level, to limit the uncertain entropy value of the line failure in the distribution network by referring to the Shannon information theory:

$$\sum_{(i,j)\in\Omega_L} (-\log_2 p_{ij}^{dam})z_{ij,0} \leq W_{max} \quad (10)$$

In the above formula, $p_{ij}^{dam}$ represents the line failure rate; and $z_{ij,0}$ represents the binary variable, indicating whether the failure occurs on the line, and the value of the binary variable is 1 when the failure occurs and 0 when no failure occurs. $W_{max}$ represents the upper limit of the uncertain entropy value of the line failure in the distribution network. Obviously, if the line failure rate is 0, $\log_2 p_{ij}^{dam}$ tends to be positive infinity. Due to the limitation of $W_{max}$, $z_{ij,0}$ is bound to be 0. If the line failure rate is 1, $\log_2 p_{ij}^{dam}=0$, which means that the line failure does not occupy any uncertain share. Therefore, due to a limitation of a robust layer, $z_{ij,0}$ is bound to be 1. With an increase in the line failure rate, a share of the uncertain entropy value occupied by the line failure is smaller, and a failure probability is larger. Compared with a limitation on a quantity of broken lines caused by the failure, the formula (10) is very suitable for a failure scenario in which a failure rate of each line is different.

It should be noted that spatio-temporal evolution processes of the extreme event and a failure set are huge topics. Most of existing studies focus on a certain type of extreme event (such as typhoons), divide the distribution network into a plurality of sub-regions, and then map evolution stages of the extreme event to the sub-regions. Compared with a single-region model of a single failure stage, complexity and a simulation degree are improved, but essential methods are not obviously different. Moreover, the present disclosure studies a planning strategy, and it is difficult to predict a type and evolution of the extreme event in a planning period. Therefore, the present disclosure does not consider space-time evolution characteristics of the extreme event.

It is assumed that a failure occurs at time $t_0$, a faulty line is repaired at time $t_0+T$, and a superior power supply is resumed. A state of the line keeps unchanged during the failure. In this case, the following formula is obtained:

$$u_{ij,t}=z_{ij,0}, \forall (i,j)\in\Omega_L, \forall t\in T \quad (11).$$

In the above formula, $u_{ij,t}$ represents a faulty state of the line at time t. A value 1 indicates that the line is in the faulty state; otherwise, the line is not faulty. A middle-level decision variable is $U=\{z_{ij,0}, u_{ij,t}\}$.

The line failure rate is associated with the hardening strategy in the first stage, which leads to mutual restriction of the decision variables in the two stages. Therefore, a stage correlation constraint needs to be supplemented.

Line hardening can significantly reduce the failure rate. However, the failure rate usually is not reduced to 0, and a failure rate of a line not hardened may not be 1 in the face of the extreme event. It is assumed that the failure rate of the line is $p_{ij}^0$ before hardening and $p_{ij}^1$ after hardening. The following formula is obtained:

$$\log_2 p_{ij}^{dam} = \left(\log_2 \frac{p_{ij}^1}{p_{ij}^0}\right) y_{ij} + \log_2 p_{ij}^0 \quad (12)$$

In step 104, an inner-level constraint is determined based on node power of the distribution network, a line load capacity, a line power flow, a power output of a unit, a node voltage, climbing of the unit, operation of the ESS, and LS.

Preferably, the inner-level constraint includes: a sub-constraint on the node power of the distribution network, a sub-constraint on the line load capacity, a sub-constraint on the line power flow, a power output sub-constraint of the unit, a node voltage sub-constraint, a climbing sub-constraint of the unit, a state sub-constraint of the ESS, and an LS sub-constraint;

the state sub-constraint of the ESS includes:

$$S_i(t) = S_i(t-1) + p_i^{ch}(t)\eta_{ch}\Delta t - \frac{p_i^{dis}(t)\Delta t}{\eta_{dis}}, \forall i\in\Omega_B, \forall t\in T$$

$$SOC_{i,min} \leq \frac{S_i(t)}{E_i^R} \leq SOC_{i,max}, \forall i\in\Omega_B, \forall t\in T$$

$$0 \leq p_i^{ch}(t) \leq P_i^R, \forall i\in\Omega_B, \forall t\in T$$

$$0 \leq p_i^{dis}(t) \leq P_i^R, \forall i\in\Omega_B, \forall t\in T$$

$$p_i^{ch}(t)\cdot p_i^{dis}(t) = 0, \forall i\in\Omega_B, \forall t\in T;$$

and the LS sub-constraint includes:

$$0\leq \rho_{i,t}\leq 1, \forall i\in\Omega_B, \forall t\in T$$

where $S_i(t)$ represents a remaining electricity quantity at time t; $\eta_{ch}, \eta_{dis}$ represent charging efficiency and discharging efficiency respectively; $\Delta t$ represents a time interval; $p_i^{ch}(t)$ represents charging power; $p_i^{dis}(t)$ represents discharging power; and $P_i^R$ represents an upper charging/discharging limit.

In the present disclosure, a dispatching operation strategy of the AC distribution network disconnected from the main network and a disaster response strategy during the failure are determined at the inner level, and a corresponding decision n variable is $x\in\{p_{i,t}^G, q_{i,t}^G, p_{i,t}^{dis}, p_{i,t}^{ch}, v_{i,t}, p_{s,t}, p_{d,t}, q_{s,t}, M_t, \delta_t, \rho_{i,t}\}$. The following constraints are included:

(1) Sub-Constraint on Node Power Balance of the Distribution Network:

$$p_{i,t}^G + p_{i,t}^{dis} - p_{i,t}^{ch} = \sum_{(i,j)\in\Omega_L^{AC}} p_{ij,t} + (1-\rho_{i,t})p_{i,t}^D + \left(\sum_{(i,j)\in\Omega_L^{AC}} G_{ij}\right)V_i^2, \quad (13)$$

$$\forall i\in\Omega_B^{AC}, \forall t\in T$$

$$q_{i,t}^G = \sum_{(i,j)\in\Omega_L^{AC}} q_{ij,t} + (1-\rho_{i,t})q_{i,t}^D - \left(\sum_{(i,j)\in\Omega_L^{AC}} B_{ij}\right)V_i^2, \quad (14)$$

$$\forall i\in\Omega_B^{AC}, \forall t\in T$$

$$p_{i,t}^G + p_{i,t}^{dis} - p_{i,t}^{ch} = \sum_{(i,j)\in\Omega_L^{DC}} p_{ij,t} + (1-\rho_{i,t})p_{i,t}^D, \quad (15)$$

$$\forall i\in\Omega_B^{DC}, \forall t\in T$$

In the above formulas, $\Omega_B^{AC}$ represents the node set of the AC distribution network, and $\Omega_L^{AC}$ represents the line set of the AC distribution network. $p_i^G$ and $q_i^G$ respectively represent a sum of active power outputs of a power supply of node i connected to the AC distribution network and a sum of reactive power outputs of the power supply of node i connected to the AC distribution network. $p_i^D$ and $q_i^D$ respectively represent active load and reactive load connected to node i. G and B represent node admittance matrices of the AC distribution network. $v_i$ represents a voltage amplitude of node i.

(2) Sub-Constraint on the Line Load Capacity:

$$p_{ij,t}^2 + q_{ij,t}^2 \leq (1-u_{ij,t}) \cdot (S_{ij}^{max})^2, \forall (i,j) \in \Omega_L^{AC}, \forall t \in T \quad (16)$$

$$-P_{ij}^{max} \leq p_{ij,t} \leq P_{ij}^{max}, \forall (i,j) \in \Omega_L^{DC}, \forall t \in T \quad (17)$$

In the above formulas, $S_{ij}^{max}$ represents an upper limit of apparent power transmitted by the line.

(3) Sub-Constraint on the Line Power Flow:

$$-M_1 u_{ij,t} \leq p_{ij,t} + G_{ij} v_{i,t}^2 - v_{i,t} v_{j,t} (G_{ij} \cos\theta_{ij,t} + B_{ij} \sin\theta_{ij,t}) \leq M_1 u_{ij,t}, \quad (18)$$
$$\forall i \in \Omega_L^{AC}, \forall t \in T$$

$$-M_2 u_{ij,t} \leq q_{ij,t} - B_{ij} v_{i,t}^2 - v_{i,t} v_{j,t} (G_{ij} \sin\theta_{ij,t} - B_{ij} \cos\theta_{ij,t}) \leq M_2 u_{ij,t}, \quad (19)$$
$$\forall i \in \Omega_L^{AC}, \forall t \in T$$

$$-M_3 u_{ij,t} \leq p_{ij,t} - \frac{1}{r_{ij}}(v_{i,t}^2 - v_{i,t} v_{j,t}) \leq M_3 i_{ij,t}, \forall i \in \Omega_L^{DC}, \forall t \in T \quad (20)$$

In the above formulas, $p_{ij}$ and $q_{ij}$ respectively represent active power and reactive power transmitted by the line. A default positive direction is from node i to node j. $\theta_{ij}$ represents a difference between voltage phase angles of node i and node j. $M_1$, $M_2$, $M_3$ represent large enough positive constants, and they only need to be slightly greater than an upper limit of an absolute value of the corresponding power flow.

(4) Power Output Sub-Constraint of the Unit:

$$\Delta P_i^{G,min} \leq p_{i,t}^G \leq P_i^{G,max}, \forall i \in \Omega_G, \forall t \in T \quad (21)$$

$$Q_i^{G,min} \leq q_{i,t}^G \leq Q_i^{G,max}, \forall i \in \Omega_G^{AC}, \forall t \in T \quad (22)$$

In the above formulas, $P_i^{G,max}, P_i^{G,min}$ respectively represent upper and lower limits of an active power output of the unit. Upper and lower limits of a reactive power output of the unit are similar. $\Omega_G^{AC}$ represents a DG set of the AC distribution network.

(5) Node Voltage Sub-Constraint:

$$V_i^{min} \leq v_{i,t} \leq V_i^{max}, \forall i \in \Omega_B, \forall t \in T \quad (23)$$

$$-2\pi \leq \theta_{i,t} \leq 2\pi, \forall i \in \Omega_B^{AC}, \forall t \in T \quad (24).$$

In the above formulas, $V_i^{max}, V_i^{min}$ respectively represent upper and lower limits of the voltage amplitude of node i.

(6) Climbing Sub-Constraint of the Unit:

$$\Delta P_i^{G,min} \leq p_{i,t}^G - p_{i,t-1}^G \leq \Delta P_i^{G,max}, \forall i \in \Omega_G, \forall t \in T \quad (25)$$

$$\Delta Q_i^{G,min} \leq q_{i,t}^G - q_{i,t-1}^G \leq \Delta Q_i^{G,max}, \forall i \in \Omega_G^{AC}, \forall t \in T \quad (26)$$

In the above formulas, $\Delta P_i^{G,min}$ and $\Delta P_i^{G,max}$ respectively represent slipping and climbing limitations of unit i. In addition, it is necessary to set a power output state of the unit at a time point before the failure to constrain a power output of the unit when the failure occurs.

(7) State Sub-Constraint of the ESS:

$$S_i(t) = S_i(t-1) + p_i^{ch}(t)\eta_{ch}\Delta t - \frac{p_i^{dis}(t)\Delta t}{\eta_{dis}}, \forall i \in \Omega_B, \forall t \in T \quad (27)$$

$$SOC_{i,min} \leq \frac{S_i(t)}{E_i^R} \leq SOC_{i,max}, \forall i \in \Omega_B, \forall t \in T \quad (28)$$

-continued $$0 \leq p_i^{ch}(t) \leq P_i^R, \forall i \in \Omega_B, \forall t \in T \quad (29)$$

$$0 \leq p_i^{dis}(t) \leq P_i^R, \forall i \in \Omega_B, \forall t \in T$$

$$p_i^{ch}(t) \cdot p_i^{dis}(t) = 0, \forall i \in \Omega_B, \forall t \in T \quad (30)$$

In the above formulas, the formula (27) represents a constraint on a power balance equation of the ESS, where $S_i(t)$ represents the remaining electricity quantity of the ESS at time t, and $\eta_{ch}, \eta_{dis}$ respectively represent the charging efficiency and discharging efficiency of the ESS. The formula (28) represents a constraint on a state of charge (SOC) of the ESS. The formula (29) represents a constraint on the charging and discharging power of the ESS, and the formula (30) represents that the ESS can only be in a charging or discharging state at a time point. $\Delta t$ represents the time interval, which is uniformly set to one hour in the present disclosure.

(8) LS Sub-Constraint:

$$0 \leq \rho_{i,t} \leq 1, \forall i \in \Omega_B, \forall t \in T \quad (31)$$

In step 105, the unit hardening investment cost $c_{ij}^l$ of the line, the line length $s_{ij}$, the binary decision variable $y_{ij}$ for line hardening, a first cost coefficient $c^e$, a second cost coefficient $c^p$, and the capacity $E_i^R$ and the rated power $P_i^R$ of the ESS configured on node i are determined based on the outer-level constraint and the first sub-objective function; and the power output $c_g^G$ of the DG, the unit cost coefficient $c_i^{ch}$ of charging of the ESS, the unit cost coefficient $c_i^{dis}$ of discharging of the ESS, the unit LS cost $c_i^{LS}$ after the load weight is considered, the LS ratio $\rho_{i,t}$ of node i, and the load $p_{i,t}^D$ of node i are determined based on the middle-level constraint, the inner-level constraint, and the second sub-objective function.

With reference to FIG. 2, the unit hardening investment cost $c_i^{LS}$ of the line, the line length $s_{ij}$, the binary decision variable $y_{ij}$ for line hardening, the first cost coefficient $c^e$, the second cost coefficient $c^p$, and the capacity $E_i^R$ and the rated power $P_i^R$ of the ESS configured on node i are determined based on the outer-level constraint and the first sub-objective function; and then the power output $c_g^G$ of the DG, the unit cost coefficient $c_i^{ch}$ of charging of the ESS, the unit cost coefficient $c_i^{dis}$ of discharging of the ESS, the unit LS cost $c_i^{LS}$ after the load weight is considered, the LS ratio $\rho_{i,t}$ of node i, and the load $p_{i,t}^D$ of node i are determined based on the middle-level constraint, the inner-level constraint, and the second sub-objective function.

In step 106, energy storage of the DG in the distribution network is controlled based on the obtained parameters.

Figure 3:
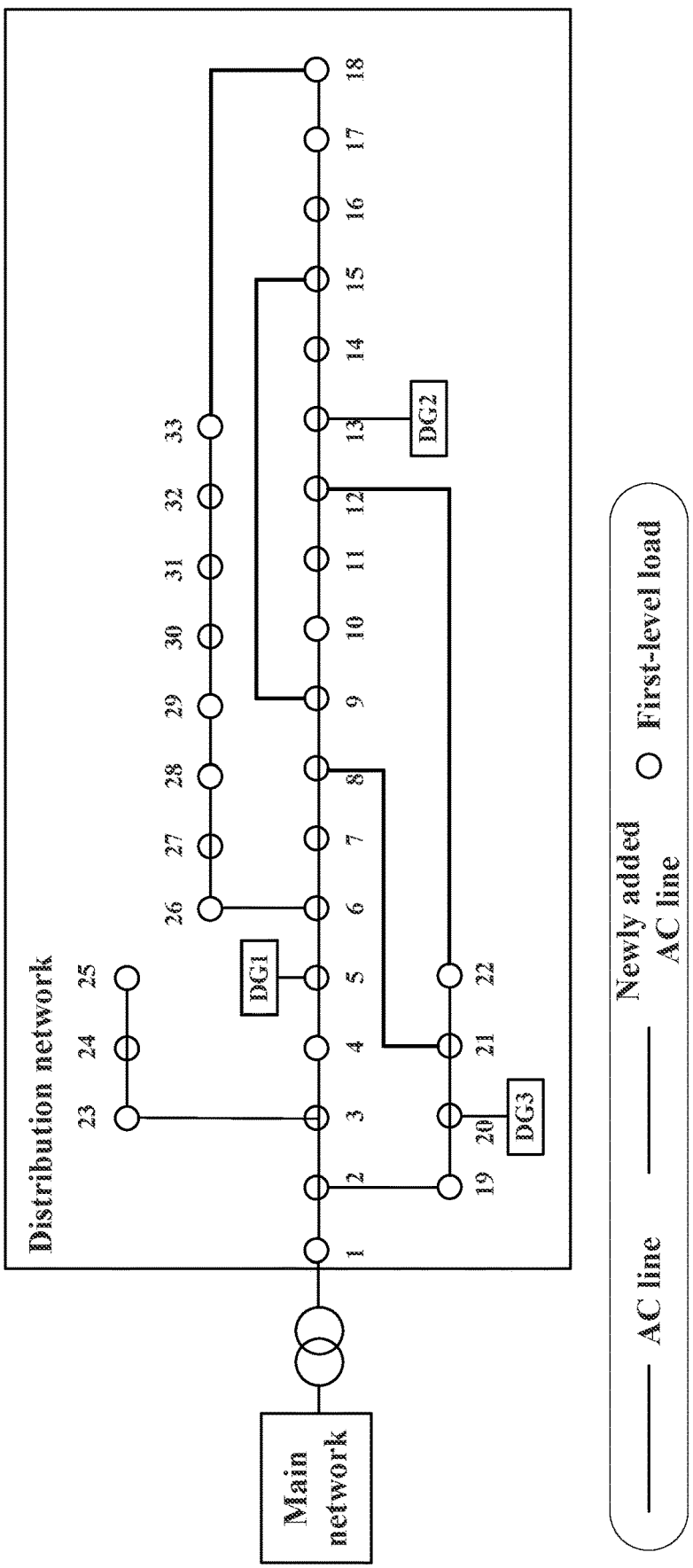
FIG. 3 is an example topological graph of a distribution network according to an implementation of the present disclosure.
Figure 4:
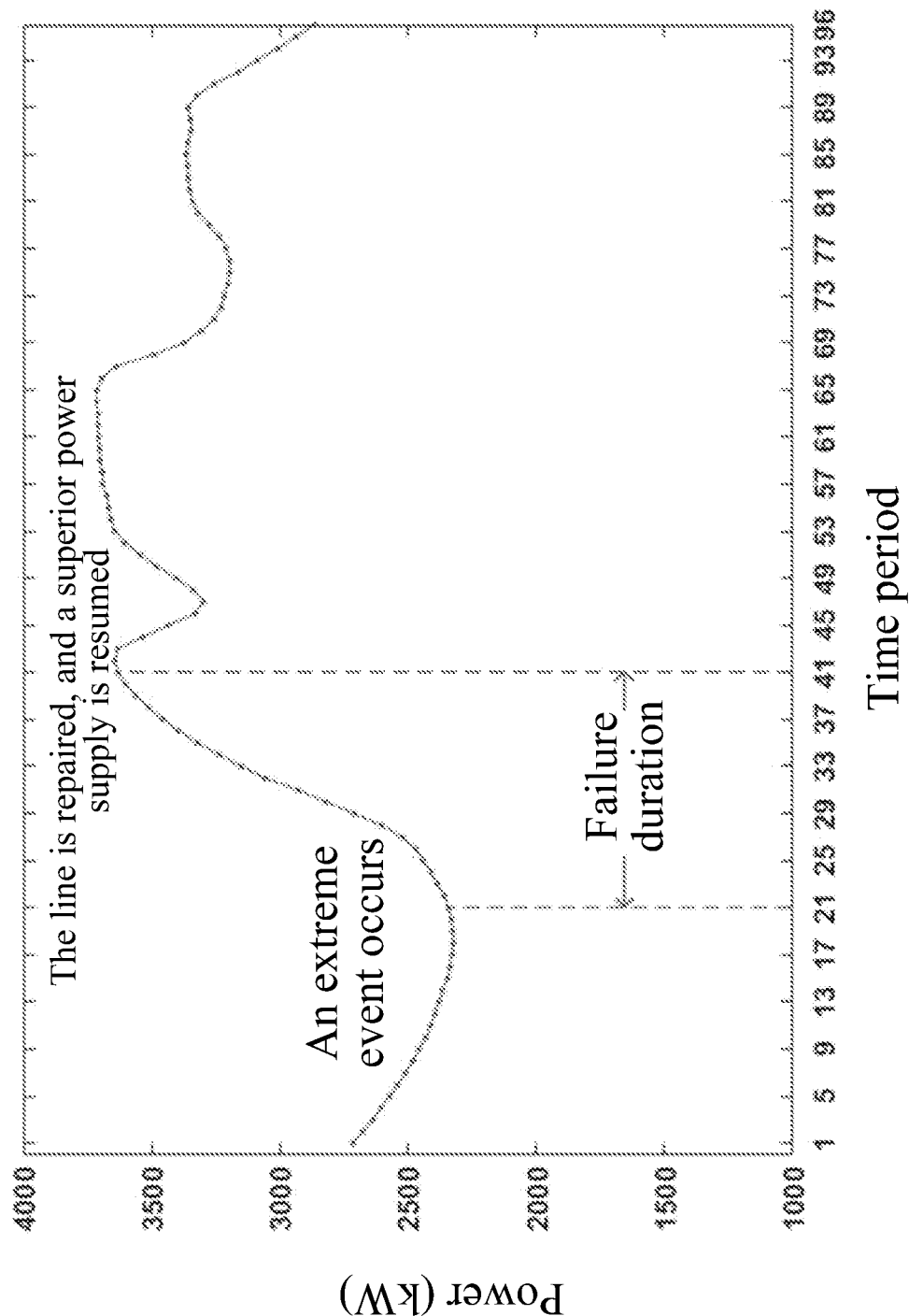
FIG. 4 is an example load curve according to an implementation of the present disclosure.
Figure 5:
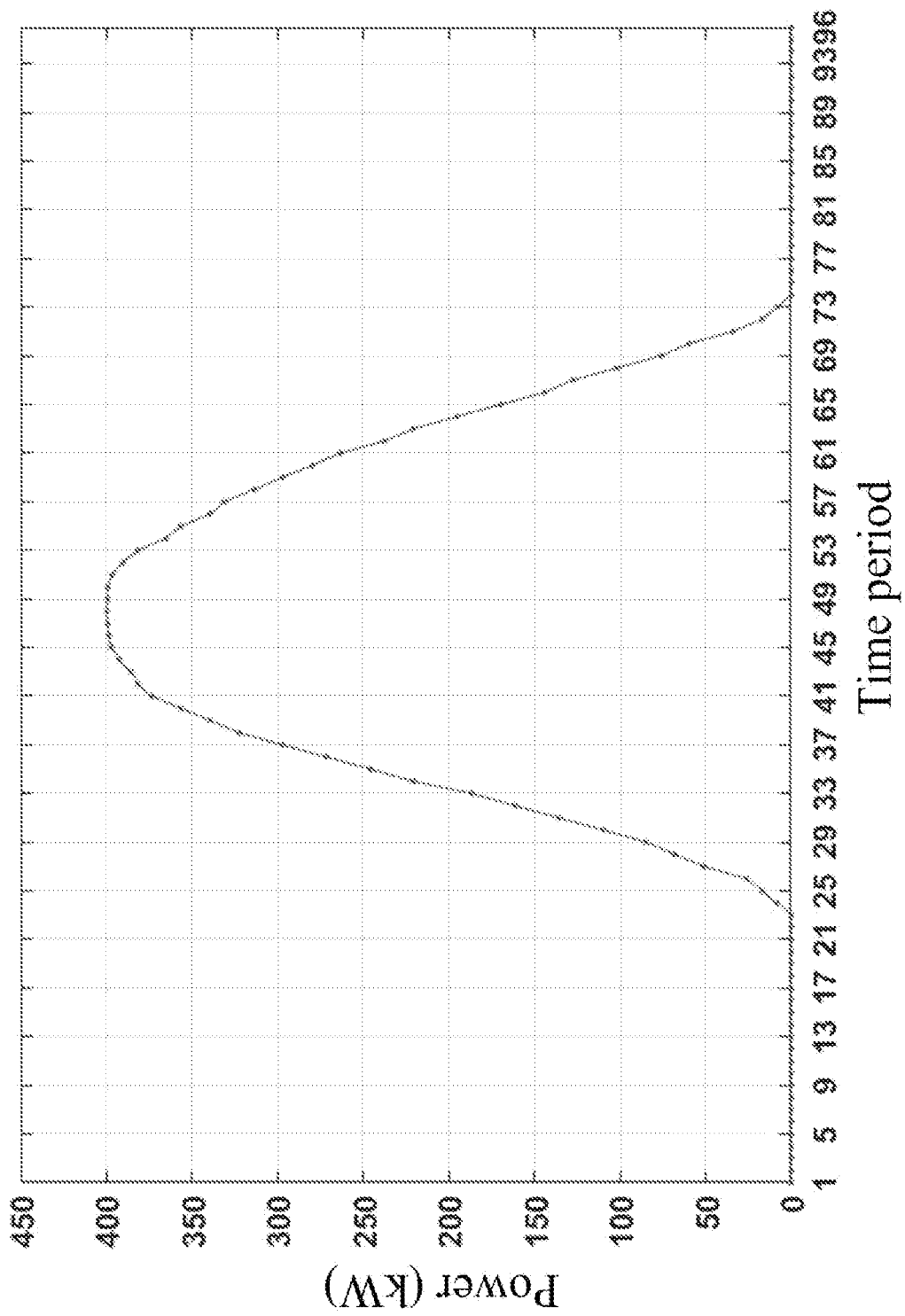
FIG. 5 is an example power output curve of a photovoltaic unit according to an implementation of the present disclosure.

In an implementation of the present disclosure, an improved AC distribution network system composed of IEEE-33 nodes is used to conduct example analysis of the proposed resilience enhancement strategy. A schematic topological graph is shown in FIG. 3. A voltage class of the AC distribution network is 12.66 kV. Four lines are added to a radial distribution network to increase its ring redundancy. All DGs connected to the AC distribution network are schedulable gas turbines. A new energy unit is only connected to the DC distribution network. Table 1 shows a type and an access location of each unit. FIG. 4 and FIG. 5 show a load curve and a power output curve of new energy. It is assumed that at most three lines are hardened, a hardening cost of a single line is 1000 CNY/m, and all the lines are 1 km long. Table 2 shows technical parameters of the ESS. The cost has been converted into a one-year cost. It is assumed that a distribution network operator has received failure warning information before an extreme event occurs, and has taken a countermeasure in advance. Therefore, an initial SOC of the ESS is set to 0.85.

After the failure occurs, the distribution network is split and disconnected from a tie line of the superior power supply. After 5 hours, the line is repaired and the superior power supply is resumed. Table 3 shows the LS cost. Considering that large users and important loads are more connected to the AC distribution network, a load weight of the AC distribution network is greater than that of the DC distribution network.

Five extreme events occur in a year, the line failure rate is 0.9 before hardening and 0.1 after hardening. It is assumed that the extreme event will cause disconnection of a tie line between the main network and the AC distribution network.

For example, four different scenarios are designed to analyze the pre-disaster resilience enhancement strategy of the distribution network. In scenario 1, the pre-disaster resilience enhancement strategy is not adopted. In scenario 2, only the line hardening strategy is adopted. In scenario 3, only the ESS configuration strategy is adopted. In scenario 4, a pre-disaster defense strategy combining line hardening and ESS configuration is adopted.

Table 4 compares the resilience enhancement strategies and corresponding effects in the four scenarios. Table 5 analyzes LS under the different scenarios. Table 6 and Table 7 list the ESS configuration strategies in scenario 3 and scenario 4 respectively. Since the load weight of the DC distribution network is low, the hardening strategy and failure are more specific to the AC distribution network.

From the analysis of the above data, it can be seen that if no pre-disaster defense strategy is adopted, the extreme event will directly lead to shedding of 57% of first-level loads of the distribution network, thus causing a huge economic loss. Although this is a result of a most serious failure, it is of very important practical significance. The extreme events include not only a natural disaster, but also a man-made attack. The natural disaster is accidental, but a malicious attack often has strong directivity. Therefore, an actual probability of a worst case is considerable and cannot be ignored. Analyzing the pre-disaster defense strategy under the most serious failure is also seeking an inevitable result from a contingency.

In scenario 2, the line hardening strategy is adopted, and the objective function is 10.7% lower than that in scenario 1. In this case, 43% of the first-level loads are still shed, and a resilience enhancement effect is limited. This is because the distribution network is already in a power vacancy state when it is disconnected, and a power shortage cannot be compensated for only through line hardening. In addition, if an important node is topologically far away from the DG, the whole line needs to be hardened to ensure power supply of an important load, which is obviously infeasible. Breaking through a budget constraint and increasing the maximum quantity of hardened lines may not enhance resilience of the distribution network. In this example, if the maximum quantity of hardened lines is set to 4, the optimal hardening strategy still keeps unchanged.

In scenario 3, only the ESS configuration strategy is adopted, and the objective function is 44.1% lower than that in scenario 1. In this case, an access point of the ESS coincides with the first-level load, and the first-level load is not shed. However, this strategy still has a large room for improvement, because ensuring a load supply of the important load by only relying on ESS configuration needs to be achieved in a point-to-point manner, which changes an original power supply mode of the distribution network. If the DG configured in the distribution network can be guided as far as possible to supply the important load, the investment cost can be further reduced. In addition, ensuring power supply for the first-level load is at the cost of large-scale LS of other loads in the AC distribution network. On one hand, due to an ESS configuration cost, the ESS does not supply electric energy to a load other than the first-level load. On the other hand, the ring redundancy of the distribution network is insufficient. If a state of a feeder switch can be remotely scheduled, and an optimal topology of the distribution network can be reconstructed in response to a disaster, large-scale LS can be further avoided. However, remote automation of the distribution network is not yet mature, a condition for configuring a remote switch on most lines is not yet available, and a large quantity of circuit breakers need to be turned on/off in reconstruction of the distribution network, which may lead to a new failure. A large quantity of binary variables also need to be introduced to configure and schedule the feeder switch, and algorithm efficiency is greatly affected by the binary variables. The present disclosure is mainly intended to ensure uninterruptible power supply of the first-level load, so the configuration and scheduling of the feeder switch are not within the scope of the present disclosure.

In scenario 4, the pre-disaster defense strategy combining line hardening and ESS configuration is adopted, and the objective function is 59.1% lower than that in scenario 1. Through analysis of investment results of scenarios 1 to 3, it can be concluded that if the DG is topologically close to the first-level load or a distance between first-level loads is short, and the DG has a sufficient capacity, the line hardening strategy is more appropriate. On the contrary, the ESS configuration strategy should be preferred. It is not difficult to know from FIG. 3 that node 4 is adjacent to DG1, and a cost of configuring the ESS on node 4 is greater than that of hardening lines 4 and 5. However, nodes 10 and 17 are far away from the DG, and line hardening costs are high. In this case, it is more appropriate to configure the ESS on the nodes. Therefore, the defense strategy combining ESS configuration and line hardening can reduce investment and planning costs while ensuring the resilience enhancement effect.

The resilience of the distribution network under the four scenarios is comprehensively evaluated based on resilience evaluation indexes. A calculation result of each index is shown in Table 8. The first column in the table lists each index weight obtained based on an entropy weight method. The last row in the table gives comprehensive resilience evaluation results obtained based on the Technique for Order Preference by Similarity to an Ideal Solution (TOPSIS). The results in the table show that a comprehensive resilience evaluation result in scenario 4 is significantly greater than comprehensive resilience evaluation results in the other three scenarios, which further verifies an effect of the planning strategy combining line hardening and ESS configuration on resilience enhancement of the distribution network.

TABLE 1

Parameters of units of the AC distribution network

| Unit No. | Bus access node | Minimum active power output (MW) | Maximum active power output (MW) | Cost (CNY/kWh) |
|---|---|---|---|---|
| DG1 | 5 | 0 | 500 | 0.5 |
| DG2 | 20 | 0 | 500 | 0.5 |
| DG3 | 24 | 0 | 500 | 0.5 |

TABLE 2

Parameters of the ESS

| Parameter name | Parameter value |
|---|---|
| Upper limit $P^{R,\ max}$ of the configurable rated power (kW) | 400 |
| Upper limit $E^{R,\ max}$ of the configurable capacity (kWh) | 100 |
| Unit power configuration cost $c^p$ (CNY/kW) | 1050 |
| Unit capacity configuration cost $c^e$ (CNY/kWh) | 3000 |
| Charging efficiency $\eta^{ch}$ | 0.9 |
| Discharging efficiency $\eta^{dis}$ | 0.9 |
| Unit charging cost $c^{ch}$ (CNY/kWh) | 0.2 |
| Unit discharging cost $c^{ch}$ (CNY/kWh) | 0.2 |
| Maximum quantity of configured ESSs | 5 |
| Initial SOC | 0.85 |
| Upper SOC limit | 0.9 |
| Lower SOC limit | 20 |

TABLE 3

LS cost

| Load type | LS cost (CNY/kWh) |
|---|---|
| First-level load | 2500 |
| Other loads in the AC distribution network | 100 |
| Load in the DC distribution network | 20 |

TABLE 4

Comparison of resilience enhancement strategies under different scenarios

| Scenario | Failure set | Line hardening strategy | Node on which ESS configuration is performed | Objective function value (10000 CNY) |
|---|---|---|---|---|
| 1 | 19-20, 4-5, 6-26, 29-30, 30-31, 2-19 | / | / | 1965.7 |
| 2 | 19-20, 3-4, 17-18, 16-17, 9-10, 10-11 | 4-5, 29-30, 28-29 | / | 1765.3 |
| 3 | 19-20, 3-4, 30-31, 15-16, 5-6, 12-13 | / | 4, 10, 17, 28, 29 | 1098.7 |
| 4 | 19-20, 3-4, 30-31, 15-16, 5-6, 27-28 | 4-5, 29-30, 28-29 | 10, 17 | 804 |

TABLE 5

LS analysis under different scenarios

| Scenario | Amount shed for the first-level load (kWh) | Amount shed for the other loads in the AC distribution network (kWh) |
|---|---|---|
| 1 | 1137.6 | 10791.6 |
| 2 | 858.2 | 7323.3 |
| 3 | 0 | 15719.8 |
| 4 | 0 | 13156.9 |

TABLE 6

ESS configuration strategy in scenario 3

| ESS No. | Node on which ESS configuration is performed | $P^R$ (kW) | $E^R$ (kWh) | Configuration cost (10000 CNY) |
|---|---|---|---|---|
| 1 | 4 | 88.5 | 588.7 | 185.9 |
| 2 | 10 | 90.7 | 613.2 | 193.5 |
| 3 | 17 | 83.5 | 561.9 | 177.3 |
| 4 | 28 | 83.1 | 545.9 | 172.5 |
| 5 | 29 | 98.2 | 660.1 | 208.3 |

TABLE 7

ESS configuration strategy in scenario 4

| ESS No. | Node on which ESS configuration is performed | $P^R$ (kW) | $E^R$ (kWh) | Configuration cost (10000 CNY) |
|---|---|---|---|---|
| 1 | 10 | 90.8 | 614.1 | 193.8 |
| 2 | 17 | 83.5 | 561.9 | 177.3 |

TABLE 8

Resilience index evaluation results

| Index name | Index weight | Scenario 1 | Scenario 2 | Scenario 3 | Scenario 4 |
|---|---|---|---|---|---|
| Proportion of a schedulable emergency resource | 0.117 | 0.883 | 0.883 | 0.905 | 0.893 |
| Emergency resource supply rate | 0.151 | 1 | 1 | 1 | 1 |
| Configuration rate of a remote feeder switch | 0.133 | 0 | 0 | 0 | 0 |
| AC/DC tie line supply rate | 0.021 | 1 | 1 | 1 | 1 |
| Expected quantity of faulty lines | 0.152 | 6 | 6 | 6 | 6 |
| Power loss time of the important load (h) | 0.089 | 5 | 5 | 0 | 0 |
| Power loss rate of the important load | 0.155 | 0.570 | 0.430 | 0 | 0 |
| Total LS loss of the distribution network (10000 CNY) | 0.182 | 393.97 | 294.53 | 159.04 | 134.98 |
| Total resilience score | / | 0 | 0.267 | 0.951 | 0.995 |

FIG. 6 is a schematic structural diagram of a resilience enhancement-oriented energy storage control system 600 for a DG in a distribution network according to an implementation of the present disclosure. As shown in FIG. 6, the resilience enhancement-oriented energy storage control system 600 for a DG in a distribution network according to this implementation of the present disclosure includes: an objective function determining unit 601, an outer-level constraint determining unit 602, a middle-level constraint determining unit 603, an inner-level constraint determining unit 604, a parameter determining unit 605, and an energy storage control unit 606.

Preferably, the objective function determining unit 601 is configured to determine an objective function, where the objective function includes a first sub-objective function and a second sub-objective function, the first sub-objective function aims to minimize an investment cost at an outer level, and the second sub-objective function first aims to maximize an LS cost and a post-disaster operation cost at a middle level, and then minimize an LS cost and a post-disaster operation cost at an inner level.

Preferably, the first sub-objective function includes:

$$\min_{y \in Y} C^{INV}$$

$$C^{INV} = C_L^{INV} + C_{ES}^{INV}$$

$$C_L^{INV} = \beta_l \sum_{(i,j) \in \Omega_L} c_{ij}^l s_{ij} y_{ij}$$

$$C_{ES}^{INV} = \beta_{es} \left( \sum_{i \in \Omega_B} c^e E_i^R + c^R P_i^R \right);$$

and
the second sub-objective function includes:

$$\rho_{pre} \tau \max_{n \in U} \min_{x \in F(y,u)} \left( C^{OPE} + C^{LS} \right)$$

$$C^{OPE} = \sum_{i \in T} \left[ \sum_{g \in \Omega_G} c_g^G p_{g,t}^G + \sum_{i \in \Omega_B} \left( c_i^{dis} + p_{i,t}^{dis} + c_i^{ch} p_{i,t}^{ch} \right) \right]$$

$$C^{LS} = \sum_{i \in \Omega_B, t \in T} c_i^{LS} \rho_{i,t} p_{i,t}^D$$

where Y,U,F represent variable sets of tri-level decision-making respectively; $C^{INV}$ represents an investment cost; $C^{OPE}$ and $C^{LS}$ represent the post-disaster operation cost and the LS cost respectively; $\rho_{pre}$ represents introduction of a resilience preference coefficient; $C_L^{INV}$ represents an investment cost for line hardening; $C_{ES}^{INV}$ represents an investment cost for energy storage resource configuration; $c_{ij}^l$ represents a unit hardening investment cost of a line; $s_{ij}$ represents a line length; $y_{ij}$ represents a binary decision variable for line hardening; $\beta_l$ represents a coefficient for converting a total investment cost of the line into a one-year cost based on a planned period; $\Omega_L$ represents a line set of an AC/DC distribution network; c' and $c^p$ represent cost coefficients; $\beta_{es}$ represents a coefficient for converting a total investment cost of an ESS into a one-year cost based on a planned period; $\Omega_B$ represents a node set of the AC/DC distribution network; $E_i^R$ and $P_i^R$ respectively represent a capacity and rated power of the ESS configured on node i; $c_i^{LS}$ represents a unit LS cost after a load weight is considered; $\rho_{i,t}$ represents an LS ratio of node i at time t; $p_{i,t}^D$ represents load of the node at the corresponding time; T represents duration of an extreme event; and $c_g^G$, $c_i^{ch}$, and $c_i^{dis}$ represent a power output of a DG, a unit cost coefficient for charging of the ESS, and a unit cost coefficient for discharging of the ESS respectively.

Preferably, the outer-level constraint determining unit 602 is configured to determine an outer-level constraint based on a quantity of configured ESSs, a quantity of hardened lines, and a rated power and capacity configuration of the ESS.

Preferably, the outer-level constraint includes: a sub-constraint on the quantity of configured ESSs, a sub-constraint on the quantity of hardened lines, and a sub-constraint on the rated power and capacity configuration of the ESS;

the sub-constraint on the quantity of configured ESSs includes:

$$\sum_{i \in \Omega_B} \sigma_i \leq N_{ES}^{INV}$$

the sub-constraint on the quantity of hardened lines includes:

$$\sum_{(i,j) \in \Omega_L} y_{tj} \leq N_L^{INV};$$

and
the sub-constraint on the rated power and capacity configuration of the ESS includes:

$$0 \leq P_i^R \leq \sigma_i P_i^{R,max}, \forall i \in \Omega_B$$

$$0 \leq E_i^R \leq \sigma_i E_i^{R,max}, \forall i \in \Omega_B$$

where $\sigma_i$ represents a binary decision variable for ESS configuration, where when a value of the variable is 1, node i is configured with the ESS, otherwise, the node is not configured with the ESS; $N_{ES}^{INV}$ represents a maximum allowable quantity of configured ESSs; $N_L^{INV}$ represents a maximum quantity of hardened lines; $P_i^{R,max}$ and $E_i^{R,max}$ respectively represent upper limits of configurable rated power and a configurable capacity of the ESS; when $\sigma_i=0$, node i is not configured with the ESS, which is equivalent to setting both the rated power and the capacity of the ESS to 0; $E_i^R$ and $P_i^R$ respectively represent the capacity and the rated power of the ESS configured on node i; $\Omega_B$ represents the node set of the AC/DC distribution network; $\Omega_L$ represents the line set of the AC/DC distribution network; and $y_{ij}$ represents the binary decision variable for line hardening.

Preferably, the middle-level constraint determining unit 603 is configured to determine a middle-level constraint based on a line failure.

Preferably, the middle-level constraint includes:

$$\sum_{(i,j) \in \Omega_L} (-\log_2 p_{tj}^{dam}) z_0 \leq W_{max}$$

where $p_{ij}^{dam}$ represents a line failure rate; $z_{ij,0}$ represents a binary variable, indicating whether a failure occurs on the line, and a value of the binary variable is 1 when a failure occurs and 0 when no failure occurs; $W_{max}$ represents an upper limit of an uncertain entropy value of the line failure in a distribution network; and $\Omega_L$ represents the line set of the AC/DC distribution network.

Preferably, the inner-level constraint determining unit 604 is configured to determine an inner-level constraint based on node power of the distribution network, a line load capacity, a line power flow, a power output of a unit, a node voltage, climbing of the unit, operation of the ESS, and LS.

Preferably, the inner-level constraint includes: a sub-constraint on the node power of the distribution network, a sub-constraint on the line load capacity, a sub-constraint on the line power flow, a power output sub-constraint of the unit, a node voltage sub-constraint, a climbing sub-constraint of the unit, a state sub-constraint of the ESS, and an LS sub-constraint;

the state sub-constraint of the ESS includes:

$$S_i(t) = S_i(t-1) + p_i^{ch}(t)\eta_{ch}\Delta t - \frac{p_i^{dis}(t)\Delta t}{\eta_{dis}}, \forall i \in \Omega_B, \forall t \in T$$

$$SOC_{i,min} \leq \frac{S_i(t)}{E_i^R} \leq SOC_{i,max}, \forall i \in \Omega_B, \forall t \in T$$

$$0 \leq p_i^{ch}(t) \leq P_i^R, \forall i \in \Omega_B, \forall t \in T$$

$$0 \leq p_i^{dis}(t) \leq P_i^R, \forall i \in \Omega_B, \forall t \in T$$

$$p_i^{ch}(t) \cdot p_i^{dis}(t) = 0, \forall i \in \Omega_B, \forall t \in T;$$

and
the LS sub-constraint includes:

$$0 \leq \rho_{i,t} \leq 1, \forall i \in \Omega_B, \forall t \in T$$

where $S_i(t)$ represents a remaining electricity quantity at time t; $\eta_{ch}, \eta_{dis}$ represent charging efficiency and discharging efficiency respectively; $\Delta t$ represents a time interval; $p_i^{ch}(t)$ represents charging power; $p_i^{dis}(t)$ represents discharging power; and $P_i^R$ represents an upper charging/discharging limit.

Preferably, the parameter determining unit 605 is configured to determine, based on the outer-level constraint and the first sub-objective function, the unit hardening investment cost $c_{ij}^l$ of the line, the line length $s_{ij}$, the binary decision variable $y_{ij}$ for line hardening, a first cost coefficient $c^e$, a second cost coefficient $c^p$, and the capacity $E_i^R$ and the rated power $P_i^R$ of the ESS configured on node i; and determine the power output $c_g^G$ of the DG, the unit cost coefficient $c_i^{ch}$ of charging of the ESS, the unit cost coefficient $c_i^{dis}$ of discharging of the ESS, the unit LS cost $c_i^{LS}$ after the load weight is considered, the LS ratio $\rho_{i,t}$ of node i, and the load $p_{i,t}^D$ of node i based on the middle-level constraint, the inner-level constraint, and the second sub-objective function.

Preferably, the energy storage control unit 606 is configured to control energy storage of the DG in the distribution network based on the obtained parameters.

The resilience enhancement-oriented energy storage control system 600 for a DG in a distribution network according to this embodiment of the present disclosure corresponds to the resilience enhancement-oriented energy storage control method 100 for a DG in a distribution network according to another embodiment of the present disclosure, and details are not be described herein again.

In this embodiment of the present disclosure, the objective function determining unit 601, the outer-level constraint determining unit 602, the middle-level constraint determining unit 603, the inner-level constraint determining unit 604, the parameter determining unit 605, and the energy storage control unit 606 each may be one or more processors or controllers that each have a communication interface, can realize a communication protocol, and may further include a memory, a related interface and system transmission bus, and the like if necessary. The processor or controller executes program-related code to realize a corresponding function. In an alternative solution, the objective function determining unit 601, the outer-level constraint determining unit 602, the middle-level constraint determining unit 603, the inner-level constraint determining unit 604, the parameter determining unit 605, and the energy storage control unit 606 share an integrated chip or share devices such as a processor or a controller and a memory. The shared processor, controller or chip executes program-related codes to implement a corresponding function.

The present disclosure has been described above with reference to a few implementations. However, it is well known to those skilled in the art that, as defined by the accompanying patent claims, besides those disclosed above, other embodiments of the present disclosure are equally within the scope of the present disclosure.

Generally, all terms used in the claims are interpreted based on their usual meanings in the technical field, unless otherwise explicitly defined therein. All references to "one/the said/the [apparatus, component, or the like]" are openly interpreted as at least one instance of the said apparatus, component, or the like, unless otherwise explicitly stated. The steps of any method disclosed herein need not be performed in the exact order disclosed unless explicitly stated.

Those skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may be in a form of a computer program product that is implemented on one or more computer-usable storage media (including but not limited to a magnetic disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, such that the instructions executed by a computer or a processor of another programmable data processing device generate an apparatus for implementing a specific function in one or more processes in the flowcharts and/or in one or more blocks in the block diagrams.

These computer program instructions may be stored in a computer-readable memory that can instruct a computer or another programmable data processing device to work in a specific manner, such that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Finally, it should be noted that: the above embodiments are merely intended to describe the technical solutions of the present disclosure, rather than to limit thereto; although the present disclosure is described in detail with reference to the above embodiments, it is to be appreciated by a person of ordinary skill in the art that modifications or equivalent substitutions may still be made to the specific implementations of the present disclosure, and any modifications or equivalent substitutions made without departing from the spirit and scope of the present disclosure shall fall within the protection scope of the claims of the present disclosure.

The invention claimed is:

1. A resilience enhancement-oriented energy storage control method for a distributed generator (DG) in a distribution network, comprising:
determining an objective function, wherein the objective function comprises a first sub-objective function and a second sub-objective function, the first sub-objective function aims to minimize an investment cost at an outer level, and the second sub-objective function first aims to maximize a load shedding (LS) cost and a post-disaster operation cost at a middle level, and then minimize an LS cost and a post-disaster operation cost at an inner level;
determining an outer-level constraint based on a quantity of configured energy storage systems (ESSs), a quantity of hardened lines, and a rated power and capacity configuration of an ESS;
determining a middle-level constraint based on a line failure;
determining an inner-level constraint based on node power of a distribution network, a line load capacity, a line power flow, a power output of a unit, a node voltage, climbing of the unit, operation of the ESS, and LS;
determining, based on the outer-level constraint and the first sub-objective function, a unit hardening investment cost $c_{ij}^{I}$ of a line, a line length $s_{ij}$, a binary decision variable $y_{ij}$ for line hardening, a first cost coefficient $c^e$, a second cost coefficient $c^p$, and a capacity $E_i^R$ and rated power $P_i^R$ of an ESS configured on node i; and determining a power output $c_g^G$ of a DG, a unit cost coefficient $c_i^{ch}$ of charging of the ESS, a unit cost coefficient $c_i^{dis}$ of discharging of the ESS, a unit LS cost $c_i^{LS}$ after a load weight is considered, an LS ratio $\rho_{i,t}$ of node i, and load $p_{i,t}^D$ of node i based on the middle-level constraint, the inner-level constraint, and the second sub-objective function; and
controlling energy storage of the DG in the distribution network based on the obtained parameters.

2. The method according to claim 1, wherein the outer-level constraint comprises: a sub-constraint on the quantity of configured ESSs, a sub-constraint on the quantity of hardened lines, and a sub-constraint on the rated power and capacity configuration of the ESS;
the sub-constraint on the quantity of configured ESSs comprises:

$$\sum_{i \in \Omega_B} \sigma_j \leq N_{ES}^{INV}$$

the sub-constraint on the quantity of hardened lines comprises:

$$\sum_{(i,j)\in\Omega_L} y_{ij} \leq N_L^{INV};$$

and
the sub-constraint on the rated power and capacity configuration of the ESS comprises $$0 \leq P_i^R \leq \sigma_i P_i^{R,max}, \forall i \in \Omega_B$$

$$0 \leq E_i^R \leq \sigma_i E_i^{R,max}, \forall i \in \Omega_B$$

wherein $\sigma_i$ represents a binary decision variable for ESS configuration, wherein when a value of the variable is 1, node i is configured with the ESS, otherwise, the node is not configured with the ESS; $N_{ES}^{INV}$ represents a maximum allowable quantity of configured ESSs; $N_L^{INV}$ represents a maximum quantity of hardened lines; $P_i^{R,max}$ and $E_i^{R,max}$ respectively represent upper limits of configurable rated power and a configurable capacity of the ESS; when $\sigma_i=0$, node i is not configured with the ESS, which is equivalent to setting both the rated power and the capacity of the ESS to 0; $E_i^R$ and $P_i^R$ respectively represent the capacity and the rated power of the ESS configured on node i; $\Omega_B$ represents a node set of an alternating current (AC)/direct current (DC) distribution network; $\Omega_L$ represents a line set of the AC/DC distribution network; and $y_{ij}$ represents the binary decision variable for line hardening.

3. The method according to claim 1, wherein the middle-level constraint comprises:

$$\sum_{(i,j)\in\Omega_L} (-\log_2 p_{ij}^{dam}) z_{ij,0} \leq W_{max}$$

wherein $p_{ij}^{dam}$ represents a line failure rate; $z_{ij,0}$ represents a binary variable, indicating whether a failure occurs on the line, and a value of the binary variable is 1 when a failure occurs and 0 when no failure occurs; $W_{max}$ represents an upper limit of an uncertain entropy value of the line failure in the distribution network; and $\Omega_L$ represents a line set of an AC/DC distribution network.

4. The method according to claim 1, wherein the inner-level constraint comprises: a sub-constraint on the node power of the distribution network, a sub-constraint on the line load capacity, a sub-constraint on the line power flow, a power output sub-constraint of the unit, a node voltage sub-constraint, a climbing sub-constraint of the unit, a state sub-constraint of the ESS, and an LS sub-constraint;
the state sub-constraint of the ESS comprises:

$$S_i(t) = S_i(t-1) + p_i^{ch}(t)\eta_{ch}\Delta t - \frac{p_i^{dis}(t)\Delta t}{\eta_{dis}}, \forall i \in \Omega_B, \forall t \in T$$

$$SOC_{i,min} \leq \frac{S_i(t)}{E_i^R} \leq SOC_{i,max}, \forall i \in \Omega_B, \forall t \in T$$

$$0 \leq p_i^{ch}(t) \leq P_i^R, \forall i \in \Omega_B, \forall t \in T$$

$$0 \leq p_i^{dis}(t) \leq P_i^R, \forall i \in \Omega_B, \forall t \in T$$

$$p_i^{ch}(t) \cdot p_i^{dis}(t) = 0, \forall i \in \Omega_B, \forall t \in T;$$

and
the LS sub-constraint comprises:

$$0 \leq \rho_{i,t} \leq 1, \forall i \in \Omega_B, \forall t \in T$$

wherein $S_i(t)$ represents a remaining electricity quantity at time t; $\eta_{ch}, \eta_{dis}$ represent charging efficiency and discharging efficiency respectively; $\Delta t$ represents a time interval; $p_i^{ch}(t)$ represents charging power; $p_i^{dis}(t)$ represents discharging power; and $P_i^R$ represents an upper charging/discharging limit.

5. The method according to claim 1, wherein the first sub-objective function comprises:

$$\min_{y \in Y} C^{INV}$$

$$C^{INV} = C_L^{INV} + C_{ES}^{INV}$$

$$C_L^{INV} = \beta_l \sum_{(i,j)\in\Omega_L} c_{ij}^l s_{ij} y_{ij}$$

$$C_{ES}^{INV} = \beta_{es}\left(\sum_{i\in\Omega_B} c^e E_i^R + c^p P_i^R\right);$$

and
the second sub-objective function comprises:

$$\rho_{pre} T \max_{u \in U} \min_{x \in F(y,u)} (C^{OPE} + C^{LS})$$

$$C^{OPE} = \sum_{t\in T}\left[\sum_{g\in\Omega_G} c_g^G p_{g,t}^G + \sum_{i\in\Omega_B}(c_i^{dis} p_{i,t}^{dis} + c_i^{ch} p_{i,t}^{ch})\right]$$

$$C^{LS} = \sum_{i\in\Omega_B, t\in T} c_i^{LS} \rho_{i,t} p_{i,t}^D$$

wherein Y,U,F represent variable sets of tri-level decision-making respectively; $C^{INV}$ represents an investment cost; $C^{OPE}$ and $C^{LS}$ represent the post-disaster operation cost and the LS cost respectively; $\rho_{pre}$ represents introduction of a resilience preference coefficient; $C_L^{INV}$ represents an investment cost for line hardening; $C_{ES}^{INV}$ represents an investment cost for energy storage resource configuration; $c_{ij}^l$ represents the unit hardening investment cost of the line; $s_{ij}$ represents the line length; $y_{ij}$ represents the binary decision variable for line hardening; $\beta_l$ represents a coefficient for converting a total investment cost of the line into a one-year cost based on a planned period; $\Omega_L$ represents a line set of an AC/DC distribution network; $c^e$ and $c^p$ represent cost coefficients; $\beta_{es}$ represents a coefficient for converting a total investment cost of the ESS into a one-year cost based on a planned period; $\Omega_B$ represents a node set of the AC/DC distribution network; $E_i^R$ and $P_i^R$ respectively represent the capacity and the rated power of the ESS configured on node i; $c_i^{LS}$ represents the unit LS cost after the load weight is considered; $\rho_{i,t}$ represents the LS ratio of node i at time t; $p_{i,t}^D$ represents the load of the node at the corresponding time; T represents duration of an extreme event; and $c_g^G$, $c_i^{ch}$, and $c_i^{dis}$ represent the power output of the DG, the unit cost coefficient for charging of the ESS, and the unit cost coefficient for discharging of the ESS respectively.

6. A resilience enhancement-oriented energy storage control system for a DG in a distribution network, comprising:
an objective function determining unit configured to determine an objective function, wherein the objective function comprises a first sub-objective function and a second sub-objective function, the first sub-objective function aims to minimize an investment cost at an outer level, and the second sub-objective function first aims to maximize an LS cost and a post-disaster operation cost at a middle level, and then minimize an LS cost and a post-disaster operation cost at an inner level;

an outer-level constraint determining unit configured to determine an outer-level constraint based on a quantity of configured ESSs, a quantity of hardened lines, and a rated power and capacity configuration of an ESS;

a middle-level constraint determining unit configured to determine a middle-level constraint based on a line failure;

an inner-level constraint determining unit configured to determine an inner-level constraint based on node power of a distribution network, a line load capacity, a line power flow, a power output of a unit, a node voltage, climbing of the unit, operation of the ESS, and LS;

a parameter determining unit configured to determine, based on the outer-level constraint and the first sub-objective function, a unit hardening investment cost $c_i^{ch}$ of a line, a line length $s_{ij}$, a binary decision variable $y_{ij}$ for line hardening, a first cost coefficient $c^e$, a second cost coefficient $c^p$, and a capacity $E_i^R$ and rated power $P_i^R$ of an ESS configured on node i; and determine a power output $c_g^G$ of a DG, a unit cost coefficient $c_i^{ch}$ of charging of the ESS, a unit cost coefficient $c_i^{dis}$ of discharging of the ESS, a unit LS cost $c_i^{LS}$ after a load weight is considered, an LS ratio $\rho_{i,t}$ of node i, and load $p_{i,t}^D$ of node i based on the middle-level constraint, the inner-level constraint, and the second sub-objective function; and an energy storage control unit configured to control energy storage of the DG in the distribution network based on the obtained parameters.

7. The system according to claim 6, wherein the outer-level constraint comprises: a sub-constraint on the quantity of configured ESSs, a sub-constraint on the quantity of hardened lines, and a sub-constraint on the rated power and capacity configuration of the ESS;

the sub-constraint on the quantity of configured ESSs comprises:

$$\sum_{i \in \Omega_B} \sigma_j \le N_{ES}^{INV}$$

the sub-constraint on the quantity of hardened lines comprises:

$$\sum_{(i,j) \in \Omega_L} y_{ij} \le N_L^{INV};$$

and the sub-constraint on the rated power and capacity configuration of the ESS comprises $$0 \le P_i^R \le \sigma_i P_i^{R,max}, \forall i \in \Omega_B$$

$$0 \le E_i^R \le \sigma_i E_i^{R,max}, \forall i \in \Omega_B$$

wherein $\sigma_i$ represents a binary decision variable for ESS configuration, where when a value of the variable is 1, node i is configured with the ESS, otherwise, the node is not configured with the ESS; $N_{ES}^{INV}$ represents a maximum allowable quantity of configured ESSs; $N_L^{INV}$ represents a maximum quantity of hardened lines; $P_i^{R,max}$ and $E_i^{R,max}$ respectively represent upper limits of configurable rated power and a configurable capacity of the ESS; when $\sigma_i=0$, node i is not configured with the ESS, which is equivalent to setting both the rated power and the capacity of the ESS to 0; $E_i^R$ and $P_i^R$ respectively represent the capacity and the rated power of the ESS configured on node i; $\Omega_B$ represents the node set of the AC/DC distribution network; $\Omega_L$ represents the line set of the AC/DC distribution network; and $y_{ij}$ represents the binary decision variable for line hardening.

8. The system according to claim 6, wherein the middle-level constraint comprises:

$$\sum_{(i,j) \in \Omega_L} (-\log_2 p_{ij}^{dam}) z_{ij,0} \le W_{max}$$

wherein $p_{ij}^{dam}$ represents a line failure rate; $z_{ij,0}$ represents a binary variable, indicating whether a failure occurs on the line, and a value of the binary variable is 1 when a failure occurs and 0 when no failure occurs; $W_{max}$ represents an upper limit of an uncertain entropy value of the line failure in the distribution network; and $\Omega_L$ represents a line set of an AC/DC distribution network.

9. The system according to claim 6, wherein the inner-level constraint comprises: a sub-constraint on the node power of the distribution network, a sub-constraint on the line load capacity, a sub-constraint on the line power flow, a power output sub-constraint of the unit, a node voltage sub-constraint, a climbing sub-constraint of the unit, a state sub-constraint of the ESS, and an LS sub-constraint;

the state sub-constraint of the ESS comprises:

$$S_i(t) = S_i(t-1) + p_i^{ch}(t)\eta_{ch}\Delta t - \frac{p_i^{dis}(t)\Delta t}{\eta_{dis}}, \forall i \in \Omega_B, \forall t \in T$$

$$SOC_{i,min} \le \frac{S_i(t)}{E_i^R} \le SOC_{i,max}, \forall i \in \Omega_B, \forall t \in T$$

$$0 \le p_i^{ch}(t) \le P_i^R, \forall i \in \Omega_B, \forall t \in T$$

$$0 \le p_i^{dis}(t) \le P_i^R, \forall i \in \Omega_B, \forall t \in T$$

$$p_i^{ch}(t) \cdot p_i^{dis}(t) = 0, \forall i \in \Omega_B, \forall t \in T;$$

and the LS sub-constraint comprises:

$$0 \le \rho_{i,t} \le 1, \forall i \in \Omega_B, \forall t \in T$$

wherein $S_i(t)$ represents a remaining electricity quantity at time t; $\eta^{ch}, \eta_{dis}$ represent charging efficiency and discharging efficiency respectively; $\Delta t$ represents a time interval; $p_i^{ch}(t)$ represents charging power; $p_i^{dis}(t)$ represents discharging power; and $P_i^R$ represents an upper charging/discharging limit.

10. The system according to claim 6, wherein the first sub-objective function comprises:

$$\min_{y \in Y} C^{INV}$$

$$C^{INV} = C_L^{INV} + C_{ES}^{INV}$$

$$C_L^{INV} = \beta_l \sum_{(i,j) \in \Omega_L} c_{ij}^l s_{ij} y_{ij}$$

$$C_{ES}^{INV} = \beta_{es} \left( \sum_{i \in \Omega_B} c^e E_i^R + c^p P_i^R \right);$$

and
the second sub-objective function comprises:

$$\rho_{pre} T \max_{u \in U} \min_{x \in F(y,u)} \left( C^{OPE} + C^{LS} \right)$$

$$C^{OPE} = \sum_{t \in T} \left[ \sum_{g \in \Omega_G} c_g^G p_{g,t}^G + \sum_{i \in \Omega_B} \left( c_i^{dis} p_{i,t}^{dis} + c_i^{ch} p_{i,t}^{ch} \right) \right]$$

$$C^{LS} = \sum_{i \in \Omega_B, t \in T} c_i^{LS} \rho_{i,t} p_{i,t}^D$$

wherein Y,U,F represent variable sets of tri-level decision-making respectively; $C^{INV}$ represents an investment cost; $C^{OPE}$ and $C^{LS}$ represent the post-disaster operation cost and the LS cost respectively; $\rho_{pre}$ represents introduction of a resilience preference coefficient; $C_L^{INV}$ represents an investment cost for line hardening; $C_{ES}^{INV}$ represents an investment cost for energy storage resource configuration; $c_{ij}^l$ represents the unit hardening investment cost of the line; $s_{ij}$ represents the line length; $y_{ij}$ represents the binary decision variable for line hardening; $\beta_l$ represents a coefficient for converting a total investment cost of the line into a one-year cost based on a planned period; $\Omega_L$ represents a line set of an AC/DC distribution network; $c^e$ and $c^p$ represent cost coefficients; $\beta_{es}$ represents a coefficient for converting a total investment cost of the ESS into a one-year cost based on a planned period; $\Omega_B$ represents a node set of the AC/DC distribution network; $E_i^R$ and $P_i^R$ respectively represent the capacity and the rated power of the ESS configured on node i; $c_i^{LS}$ represents the unit LS cost after the load weight is considered; $\rho_{i,t}$ represents the LS ratio of node i at time t; $\rho_{i,t}^D$ represents the load of the node at the corresponding time; T represents duration of an extreme event; and $c_g^G$, $c_i^{ch}$, and $c_i^{dis}$ represent the power output of the DG, the unit cost coefficient for charging of the ESS, and the unit cost coefficient for discharging of the ESS respectively.

* * * * *